US010296095B2

(12) United States Patent
Olsson

(10) Patent No.: US 10,296,095 B2
(45) Date of Patent: May 21, 2019

(54) SLIM PROFILE MAGNETIC USER INTERFACE DEVICES

(71) Applicant: Mark S. Olsson, La Jolla, CA (US)

(72) Inventor: Mark S. Olsson, La Jolla, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 14/748,138

(22) Filed: Jun. 23, 2015

(65) Prior Publication Data

US 2016/0378191 A1 Dec. 29, 2016
US 2018/0284899 A9 Oct. 4, 2018

Related U.S. Application Data

(63) Continuation of application No. 13/292,038, filed on Nov. 8, 2011, now Pat. No. 9,134,817.

(60) Provisional application No. 61/525,766, filed on Aug. 20, 2011, provisional application No. 61/424,496, filed on Dec. 17, 2010, provisional application No. 61/419,150, filed on Dec. 2, 2010, provisional application No. 61/411,406, filed on Nov. 8, 2010.

(51) Int. Cl.

| G06F 1/16 | (2006.01) |
| G06F 3/01 | (2006.01) |
| G05G 9/047 | (2006.01) |
| G06F 3/0338 | (2013.01) |
| G06F 3/0346 | (2013.01) |
| G01D 5/14 | (2006.01) |

(52) U.S. Cl.

CPC .............. *G06F 3/017* (2013.01); *G01D 5/14* (2013.01); *G05G 9/047* (2013.01); *G06F 1/169* (2013.01); *G06F 3/0338* (2013.01); *G06F 3/0346* (2013.01); *G05G 2009/04755* (2013.01)

(58) Field of Classification Search

USPC ........................................................ 345/156
See application file for complete search history.

(56) References Cited

U.S. PATENT DOCUMENTS

| 3,112,464 A | 11/1963 | Ratajaski |
| 3,170,323 A | 2/1965 | Kurt |
| 3,331,971 A | 7/1967 | Moller |
| 3,764,779 A | 10/1973 | Kadoya |

(Continued)

FOREIGN PATENT DOCUMENTS

| DE | 19501439 | 9/1996 |
| DE | 19806611 | 8/1999 |

(Continued)

OTHER PUBLICATIONS

Tietsworth, Steven C., Response to Non-Final Office Action and Amendment (dated Jan. 7, 2012), regarding Magnetic Manual User Interface Devices, U.S. Appl. No. 12/756,068.

*Primary Examiner* — Gustavo Polo
(74) *Attorney, Agent, or Firm* — Steven C. Tietsworth, Esq.

(57) ABSTRACT

Slim profile magnetic user interface devices (slim UIDs) are disclosed. A slim UID may include a slim profile housing, a movable actuator assembly having user contact surfaces on opposite sides, along with a magnet, magnetic sensor, restoration element, and processing element. User mechanical interaction with the actuator element may be sensed by the magnetic sensor and processed to generate output signals usable by a coupled electronic computing system.

17 Claims, 16 Drawing Sheets

(56) References Cited

U.S. PATENT DOCUMENTS

| | | | |
|---|---|---|---|
| 3,980,808 A | 9/1976 | Kikuchi | |
| 4,107,604 A | 8/1978 | Bernier | |
| 4,161,726 A | 7/1979 | Burson | |
| 4,216,467 A | 8/1980 | Colston | |
| 4,293,837 A | 10/1981 | Jaffe | |
| 4,348,142 A | 9/1982 | Figour | |
| 4,459,578 A | 7/1984 | Sava | |
| 4,489,303 A | 12/1984 | Martin | |
| 4,500,867 A | 2/1985 | Ishitobo | |
| 4,651,558 A | 3/1987 | Martin | |
| 4,733,214 A | 3/1988 | Andresen | |
| 4,774,458 A | 9/1988 | Aronoff | |
| 4,785,180 A | 11/1988 | Dietrich | |
| 4,825,157 A | 4/1989 | Milkan | |
| 4,853,630 A | 8/1989 | Houston | |
| 4,879,556 A | 11/1989 | Duimel | |
| 4,998,182 A | 3/1991 | Krauter | |
| 5,045,842 A | 9/1991 | Galvin | |
| 5,146,566 A | 9/1992 | Hollis, Jr. | |
| 5,160,918 A | 11/1992 | Saposnik | |
| 5,168,221 A | 12/1992 | Houston | |
| 5,450,054 A | 9/1995 | Schmersal | |
| 5,504,502 A | 4/1996 | Arita | |
| 5,525,901 A | 6/1996 | Clymer | |
| 5,565,891 A | 10/1996 | Armstrong | |
| 5,598,090 A | 1/1997 | Baker | |
| 5,619,195 A | 4/1997 | Allen | |
| 5,670,987 A | 9/1997 | Doi | |
| 5,687,080 A | 11/1997 | Hoyt | |
| 5,706,027 A | 1/1998 | Hilton | |
| 5,749,577 A | 5/1998 | Couch | |
| 5,767,840 A | 6/1998 | Selker | |
| 5,831,554 A | 11/1998 | Hedayat | |
| 5,831,596 A | 11/1998 | Marshall | |
| 5,850,142 A | 12/1998 | Rountos | |
| 5,939,679 A | 8/1999 | Olsson | |
| 5,959,863 A | 9/1999 | Hoyt | |
| 6,002,184 A | 12/1999 | Delson | |
| 6,129,527 A | 10/2000 | Donahoe | |
| 6,144,125 A | 11/2000 | Birkestrand | |
| 6,225,980 B1 | 5/2001 | Weiss | |
| 6,329,812 B1 | 12/2001 | Sundin | |
| 6,333,734 B1 | 12/2001 | Rein | |
| 6,417,838 B1 * | 7/2002 | Inamura | G06F 3/03548 345/157 |
| 6,462,731 B1 | 10/2002 | Stoffers | |
| 6,501,458 B2 | 12/2002 | Baker | |
| 6,550,346 B2 | 4/2003 | Gombert | |
| 6,573,709 B1 | 6/2003 | Gandel | |
| 6,593,729 B2 | 7/2003 | Sundin | |
| 6,597,347 B1 | 7/2003 | Yasutake | |
| 6,707,446 B2 | 3/2004 | Nakamura | |
| 6,727,889 B2 | 4/2004 | Shaw | |
| 6,738,043 B2 | 5/2004 | Endo | |
| 6,753,519 B2 | 6/2004 | Gombert | |
| 6,762,748 B2 | 7/2004 | Maatta | |
| 6,804,012 B2 | 10/2004 | Gombert | |
| 6,822,635 B2 | 11/2004 | Shahoian | |
| 6,831,629 B2 * | 12/2004 | Nishino | G05G 9/047 345/156 |
| 6,831,679 B1 | 12/2004 | Olsson | |
| 6,879,316 B2 | 4/2005 | Kehlstadt | |
| 6,891,526 B2 | 5/2005 | Gombert | |
| 6,925,975 B2 | 8/2005 | Ozawa | |
| 6,928,886 B2 | 8/2005 | Muesel | |
| 7,084,856 B2 | 8/2006 | Huppi | |
| 7,148,880 B2 | 12/2006 | Magara | |
| 7,151,526 B2 | 12/2006 | Endo | |
| 7,164,412 B2 | 1/2007 | Kao | |
| 7,233,318 B1 | 6/2007 | Farag | |
| 7,474,296 B2 | 1/2009 | Obermeyer | |
| 7,552,541 B2 | 6/2009 | Sakuri | |
| 7,733,327 B2 | 6/2010 | Harley | |
| 7,737,945 B2 | 6/2010 | West | |
| 7,800,581 B2 | 9/2010 | Lye | |
| 7,825,903 B2 | 11/2010 | Anastas | |
| 7,958,782 B2 | 6/2011 | Le | |
| 7,978,175 B2 | 7/2011 | Orsley | |
| 8,089,039 B2 | 1/2012 | Pascucci | |
| 8,100,030 B2 | 1/2012 | Koschke | |
| 8,139,033 B2 | 3/2012 | Yamamoto | |
| 8,274,358 B2 | 9/2012 | Ando | |
| 8,289,385 B2 | 10/2012 | Olsson | |
| 8,497,767 B2 | 7/2013 | Hollis, Jr. | |
| 2002/0033795 A1 | 3/2002 | Shahoian | |
| 2003/0107551 A1 | 6/2003 | Dunker | |
| 2006/0256075 A1 | 11/2006 | Anastas | |
| 2007/0182842 A1 | 8/2007 | Sonnenschein | |
| 2007/0216650 A1 | 9/2007 | Frohlich | |
| 2007/0262959 A1 | 11/2007 | Gu | |
| 2008/0001919 A1 | 1/2008 | Pascucci | |
| 2008/0174550 A1 | 7/2008 | Laurila | |
| 2008/0290821 A1 | 11/2008 | Brandt | |
| 2009/0025094 A1 | 1/2009 | York | |
| 2009/0058802 A1 | 3/2009 | Orsley | |
| 2009/0071808 A1 | 3/2009 | Kang | |
| 2009/0115749 A1 | 5/2009 | Kim | |
| 2010/0265176 A1 | 10/2010 | Olsson | |
| 2011/0050405 A1 | 3/2011 | Hollis, Jr. | |
| 2012/0287032 A1 * | 11/2012 | Olssen | G06F 3/0338 345/156 |

FOREIGN PATENT DOCUMENTS

| | | |
|---|---|---|
| EP | 0628976 | 12/1994 |
| EP | 0982646 | 3/2000 |
| EP | 1193643 | 4/2002 |
| EP | 1953621 | 6/2008 |
| JP | 03036946 | 2/1991 |
| WO | WO 01/69343 | 9/2001 |
| WO | PCT/IB10/01039 | 10/2011 |
| WO | PCT/US11/37069 | 11/2012 |
| WO | PCT/US11/48535 | 2/2013 |
| WO | PCT/US11/56039 | 4/2013 |
| WO | PCT/US11/59835 | 5/2013 |
| WO | PCT/US11/63186 | 6/2013 |
| WO | PCT/US14/38656 | 11/2015 |

* cited by examiner

SLIM PROFILE MAGNETIC USER INTERFACE DEVICES

CROSS-REFERENCE TO RELATED APPLICATIONS

This application is a continuation of and claims priority to co-pending U.S. patent application Ser. No. 13/292,038, filed Nov. 8, 2011, entitled SLIM PROFILE MAGNETIC USER INTERFACE DEVICES, which claims priority under 35 U.S.C. § 119(e) to U.S. Provisional Patent Application Ser. No. 61/411,406, filed Nov. 8, 2010, entitled SLIM PROFILE MAGNETIC USER INTERFACE DEVICES, to U.S. Provisional Patent Application Ser. No. 61/419,150, filed Dec. 2, 2010, entitled MAGNETICALLY SENSED KNOB-ACTUATOR USER INTERFACE DEVICE, to U.S. Provisional Patent Application Ser. No. 61/424,496, filed Dec. 17, 2010, entitled KNOB-ACTUATOR USER INTERFACE DEVICE WITH MAGNETIC SENSORS, and to U.S. Provisional Patent Application Ser. No. 61/525,766, filed Aug. 20, 2011, entitled USER INTERFACE DEVICE METHODS AND APPARATUS USING PERMANENT MAGNETS OR ELECTROMAGNETS AND CORRESPONDING MAGNETIC SENSORS. The content of each of these applications is hereby incorporated by reference herein in its entirety for all purposes.

FIELD

This disclosure relates generally to magnetically sensed manual user interface devices, apparatus, systems, and methods. More specifically, but not exclusively, the disclosure relates to slim profile magnetically sensed user interface devices having opposing faces for allowing a user to interact, using digits of a single hand, with various electronic computing systems.

BACKGROUND

There are many electronic computing systems that have interface circuitry and/or interface software designed to function with a variety of different user interface devices, such as computer mice, trackballs, and the like, that can be manipulated by a user to input commands or data, move a cursor, select an icon, move an object or player in virtual space, and the like. Prior art user interface devices designed for use with portable electronic computing systems, such as laptop computers and smartphones, leave much room for improvement. In particular, there is a need for durable user interface devices with high resolution that are highly portable and allow for user interaction with multiple digits of a user's hand, such as a thumb and one or more fingers, as well as provide other potential advantages.

SUMMARY

This disclosure relates generally to magnetically sensed manual user interface devices, apparatus, systems, and methods. More specifically, but not exclusively, the disclosure relates to slim profile magnetically sensed user interface devices having opposing faces for allowing a user to interact, using digits of a single hand, with various electronic computing systems.

Various embodiments of apparatus, devices, and methods for providing improved user interface devices may be implemented consistent with this disclosure in which, for example, an actuator assembly having user contact surfaces on two faces is configured to magnetically sense movements generated by user contact with the actuator using, for example, a thumb and one or more fingers. The sensed signals may be processed by a processing element to generate output signals usable by an electronic computing system. One or more springs or other restoration elements may be used to restore the actuator assembly to a neutral or restored state position within a housing or case absent user interaction.

In accordance with various aspects, a manual user interface device includes a slim profile housing or case having opposite sides. An actuator assembly may be mounted in the housing and includes front and rear user contact surfaces disposed in corresponding opposite sides of the housing for manipulation by the thumb or forefinger of a user's hand. One or more magnets and one or more magnetic sensors may sense user manipulation of the actuator assembly and provide sensor output signals to a processing element, which may generate output signals as commands, data, controls, or other information representative of positions and/or directions of manipulation of the actuator assembly.

For example, in one aspect, the disclosure relates to a slim profile magnetically sensed user interface device (slim UID). The slim UID may include, for example, a slim profile housing assembly having a front face and a back face. The slim UID may further include a movable actuator assembly disposed in the housing assembly. The movable actuator assembly may include a front contact element having a front contact surface disposed on the front face, a back contact element having a back contact surface disposed on the back face, an actuator support assembly, and a magnet. The slim UID may further include a multi-axis magnetic sensor positioned to sense a position or motion of the movable actuator assembly and generate a magnetic sensor signal associated with the position or motion of the magnet. The slim UID may further include a processing element coupled to the multi-axis magnetic sensor which may be configured to receive the magnetic sensor signal and generate, based at least in part on the magnetic sensor signal, an output signal usable by an electronic computing system. The output signal may be further based on other sensor signals, such as inertial sensor or other sensor signals, switch signals, or other signals.

In another aspect, the disclosure relates to a computer-readable medium including instructions for causing a computer to receive and process magnetic sensor signals in a slim profile user interface device as described above.

In another aspect, the disclosure relates to slim profile magnetic user interface device means.

In another aspect, the disclosure relates to electronic computing systems including one or more slim profile magnetic user interface devices.

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
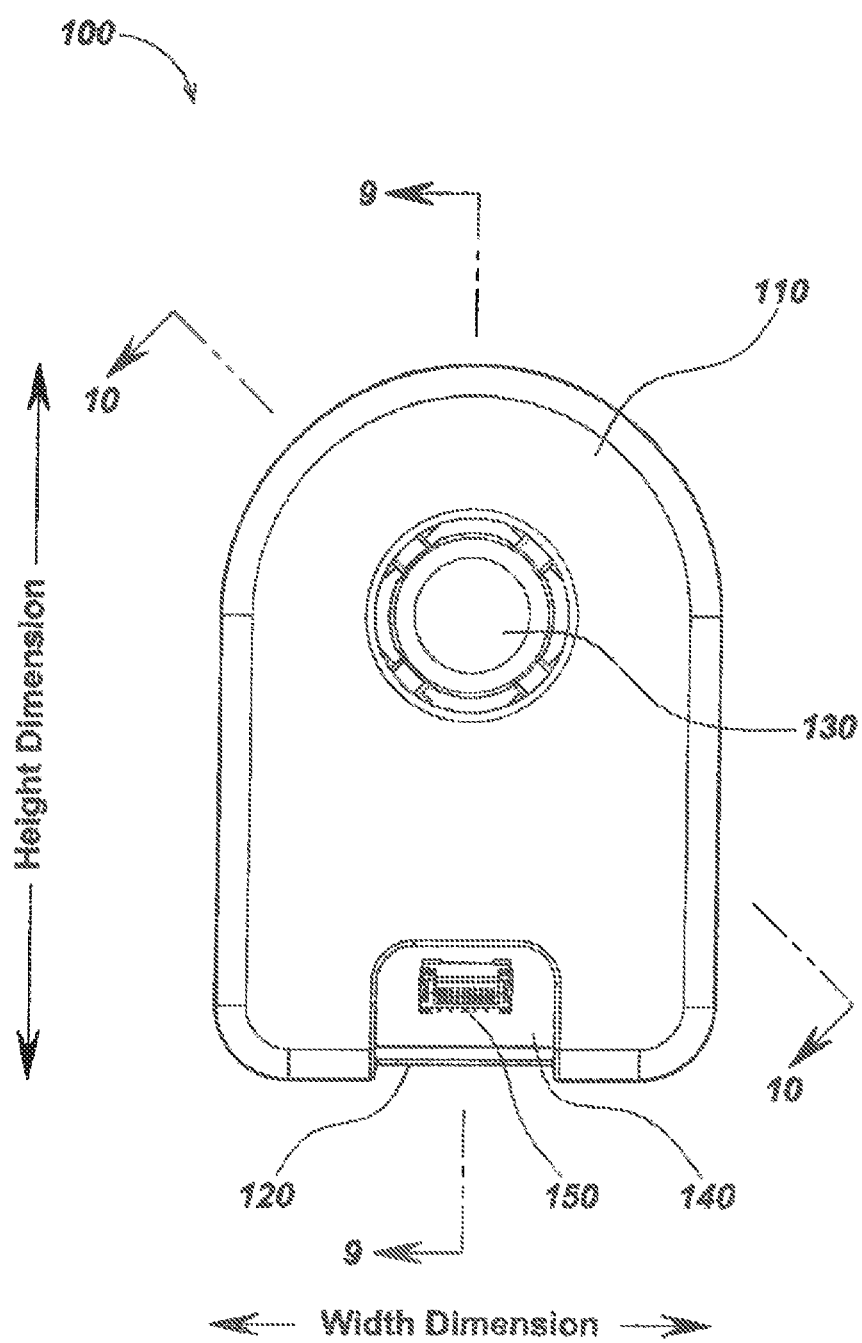
FIG. 1 is a front view of an embodiment of a slim profile magnetic user interface device.

This disclosure relates generally to magnetically sensed manual user interface devices, apparatus, systems, and methods. More specifically, but not exclusively, the disclosure relates to slim profile magnetically sensed user interface devices having opposing faces for allowing a user to interact, using digits of a single hand, with various electronic computing systems.

Various embodiments of apparatus, devices, and methods for providing improved user interface devices may be implemented consistent with this disclosure in which, for example, an actuator assembly having user contact surfaces on two faces is configured to magnetically sense movements generated by user contact with the actuator using, for example, a thumb and one or more fingers. The sensed signals may be processed by a processing element to generate output signals usable by an electronic computing system. One or more springs or other restoration elements may be used to restore the actuator assembly to a neutral or restored state position within a housing or case absent user interaction.

For example, in one aspect, the disclosure relates to a slim profile magnetically sensed user interface device (slim UID). The slim UID may include, for example, a slim profile housing assembly having a front face and a back face. The slim UID may further include a movable actuator assembly disposed in the housing assembly. The movable actuator assembly may include a front contact element having a front contact surface disposed on the front face, a back contact element having a back contact surface disposed on the back face, an actuator support assembly, and a magnet. The slim UID may further include a multi-axis magnetic sensor positioned to sense a position or motion of the movable actuator assembly and generate a magnetic sensor signal associated with the position or motion of the magnet. The slim UID may further include a processing element coupled to the multi-axis magnetic sensor which may be configured to receive the magnetic sensor signal and generate, based at least in part on the magnetic sensor signal, an output signal usable by an electronic computing system. The output signal may be further based on other sensor signals, such as inertial sensor or other sensor signals, switch signals, or other signals.

The magnet may be disposed, for example, on an actuator PCB. The magnetic sensor may be disposed on a housing PCB. One or both of the front contact element and the back contact element may be actuator caps. One or both of the front contact element and the back contact element may include elastomeric materials.

The magnet may be, for example, a permanent magnet. Alternately, or in addition, the magnet may be an electromagnet, and the user interface device may further include an electromagnet control element.

The multi-axis magnetic sensor may be, for example, a two or a three-axis magnetic sensor. In some embodiments, the magnetic sensor may be a plurality of single or multi-axis magnetic sensors. The magnetic sensor and/or processing element may be disposed on a housing printed circuit board (PCB), which may be fixedly coupled to the housing.

The actuator assembly may include, for example, an actuator PCB. The magnet may be disposed on the actuator PCB. The actuator PCB may include a plurality of sensor holes. The actuator assembly may include the magnetic sensor, and the magnet may be fixed relative to the slim profile housing assembly. The actuator assembly may include a switching element. Alternately, or in addition, the housing may include a switching element. The switching element may be coupled to one or both of the front contact element and the back contact element, such as with a punch element. The switching element may be a switch such as a dome switch. The switching element may include a plurality of switches, such as a plurality of dome switches. The plurality of switches may be disposed opposite each other along an axis of user contact in the actuator assembly.

The actuator assembly may further include, for example, a force-sensing mechanism coupled to the front contact element. The force-sensing mechanism may be a force-sensing resistor. The actuator assembly may include a vibrational element. Alternately, or in addition, the housing may include a vibrational element configured to provide a vibrational output, such as in response to a user input and/or a signal provided from an electronic computing system. The actuator assembly may further include an inertial sensing element. The inertial sensing element may be an accelerometer or other inertial sensing device. Alternately, or in addition, an inertial sensing element may be disposed on or within the housing assembly. The inertial sensing element may be configured to sense a motion or position of the housing.

The slim UID may include, for example, a restoration element coupled between the actuator assembly and the housing assembly. The restoration element may be configured to restore the slim UID actuator assembly to a released state position absent user contact. The restoration element may be a spring assembly. The spring assembly may include one or more springs. The one or more springs may be conical springs. The springs may be further configured to provide an electrically conductive signal path between the actuator assembly and the housing assembly and/or associated circuit elements such as PCBs. The conical springs may be electrical conductors configured to couple one or more electrical signals from an actuator assembly PCB and a housing PCB.

The actuator assembly may include, for example, the magnetic sensor. The magnet may be fixed relative to the slim profile housing assembly. The magnetic sensor may be disposed on an actuator PCB and the magnet may be disposed on a housing PCB.

The slim UID may further include, for example, a pressure sensing element. The pressure sensing element may be disposed on the movable actuator assembly. The pressure sensing element may be configured to sense an input pressure applied by the user to the movable actuator assembly, and provide a pressure signal to the processing element responsive to the user input.

Various additional details of aspects of magnetic user UID mechanical, electronic, hardware, and software elements, modules, and configurations are described in the following commonly assigned patent applications (denoted collectively herein as the "Related Applications"). These Related Applications include U.S. Provisional Patent Application Ser. No. 61/345,956, filed on May 18, 2010, entitled SPRING SUSPENDED MAGNETICALLY SENSED USER INTERFACE DEVICES, U.S. Provisional Patent Application Ser. No. 61/363,173, filed Jul. 9, 2010, entitled SPRING SUSPENDED MAGNETICALLY SENSED USER INTERFACE DEVICES, and U.S. Provisional Patent Application Ser. No. 61/372,025, filed Aug. 9, 2010, entitled SPRING SUSPENDED MAGNETICALLY SENSED USER INTERFACE DEVICE, U.S. Provisional Patent Application Ser. No. 61/411,406, filed Nov. 8, 2010, entitled SLIM PROFILE MAGNETIC USER INTERFACE DEVICES, U.S. Provisional Patent Application Ser. No. 61/419,150, filed Dec. 2, 2010, entitled MAGNETICALLY SENSED KNOB-ACTUATOR USER INTERFACE DEVICE, U.S. Provisional Patent Application Ser. No. 61/424,496, filed Dec. 17, 2010, entitled KNOB-ACTUATOR USER INTERFACE DEVICE WITH MAGNETIC SENSORS, U.S. Utility patent application Ser. No. 13/110,910 filed May 18, 2011, entitled USER INTERFACE DEVICES, APPARATUS, AND METHODS, and U.S. Utility patent application Ser. No. 13/214,209 filed Aug. 21, 2011, entitled MAGNETIC SENSING USER INTERFACE DEVICE METHODS AND APPARATUS, and U.S. Utility patent application Ser. No. 13/272,172, filed Oct. 12, 2011, entitled MAGNETIC THUMBSTICK USER INTERFACE DEVICES. The content of each of these Related Applications is hereby incorporated by reference herein in its entirety for all purposes.

Terminology

As used herein, the term "permanent magnet" refers to any object that is magnetized and creates its own persistent magnetic field that may be sensed by one or more associated magnetic sensors. Suitable ferromagnetic materials for a permanent magnet include iron, nickel, cobalt, rare earth metals and their alloys, e.g. Alnico and Neodymium. Permanent magnets can also be made of powderized ferromagnetic material held together with an organic binder or other appropriate magnetizable materials. In some embodiments, electromagnets may be used in place of or in addition to permanent magnets, with the electromagnets controlled by electronic control circuits and corresponding power, phase, and/or switching elements, which may be integral with or controlled by a processing element, to generate magnetic fields for sensing by associated magnetic sensors.

The term "released state" as used herein describes a state in which no operator-initiated forces are acting upon a magnetically-sensed manual actuator besides those forces which are inherently an aspect of the structure of the device itself or the environment, such as the force of gravity.

The term "electronic computing system" as used herein refers to any system that may be controlled by a manual user interface device. Examples of electronic computing systems include, but are not limited to; video game systems, robotic devices, smart phones, personal digital assistant devices (PDAs), tablet devices, desktop and notebook computers, graphical art systems such as computer aided design (CAD) systems, and computer-controlled tools, instrument devices, and similar equipment.

The terms "displace" and "displacement," when used herein in reference to the actuator and associated magnets, refer to various manual movements thereof, including, but not limited to; lateral movements along the X and Y axes, vertical movements along the Z axis, tilting, rotation, and permutations and combinations thereof. The same definition applies to movement of magnetic sensors in a converse arrangement where the magnetic sensors are coupled to the actuator and move adjacent to stationary corresponding magnets.

The term "exemplary" as used herein means "serving as an example, instance, or illustration." Any aspect, detail, function, implementation, and/or embodiment described herein as "exemplary" is not necessarily to be construed as preferred or advantageous over other aspects and/or embodiments.

Permanent magnets or electromagnets as used herein are typically closely paired with one or more magnetic sensors. In some embodiments, multiple magnetic sensors may be used to sense magnetic fields in multiple dimensions or positions; however, in an exemplary embodiment, the magnetic sensor comprises a multi-axis magnetic sensor device configured to measure two or three independent magnetic field components at approximately a single compact point in space, which is typically within the packaging of the magnetic sensor device, such as within an integrated circuit chip package.

When the position of a magnetic sensor is referenced herein, the referenced sensor position refers to a point or small area or volume in proximity to or within the sensor package where the magnetic fields generated by the magnet are measured. Further technical details regarding example devices utilizing an arrangement of magnets and magnetic sensors as may be implemented in embodiments of the present invention are described in the Related Applications, such as, for example, in U.S. patent application Ser. No. 13/110,910 filed May 18, 2011, entitled USER INTERFACE DEVICES, APPARATUS, AND METHODS, the entire disclosure of which is incorporated by reference herein.

Example Embodiments

Figure 2:
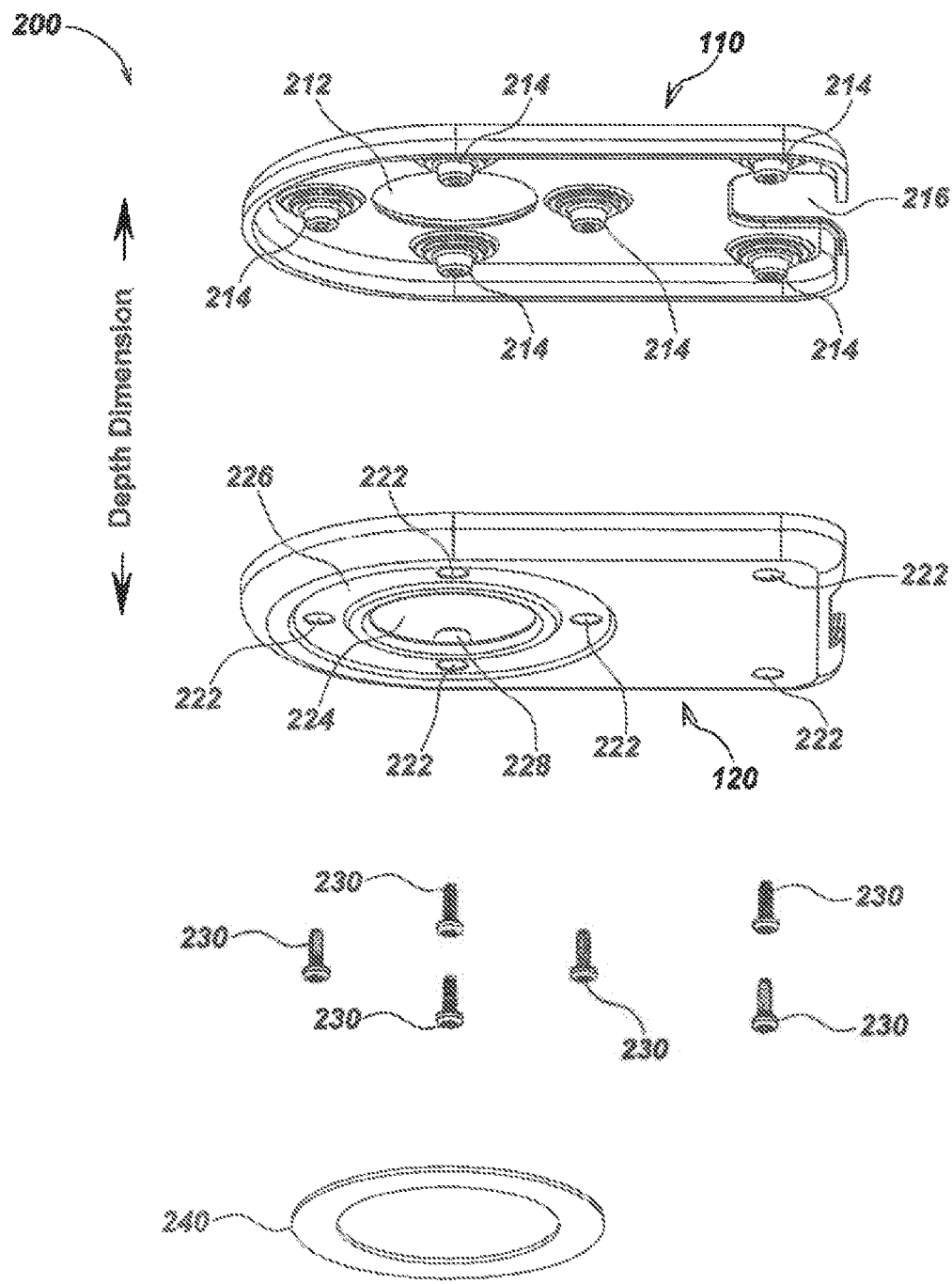
FIG. 2 is an exploded view of a device case of the embodiment of FIG. 1 taken from below.
Figure 3:
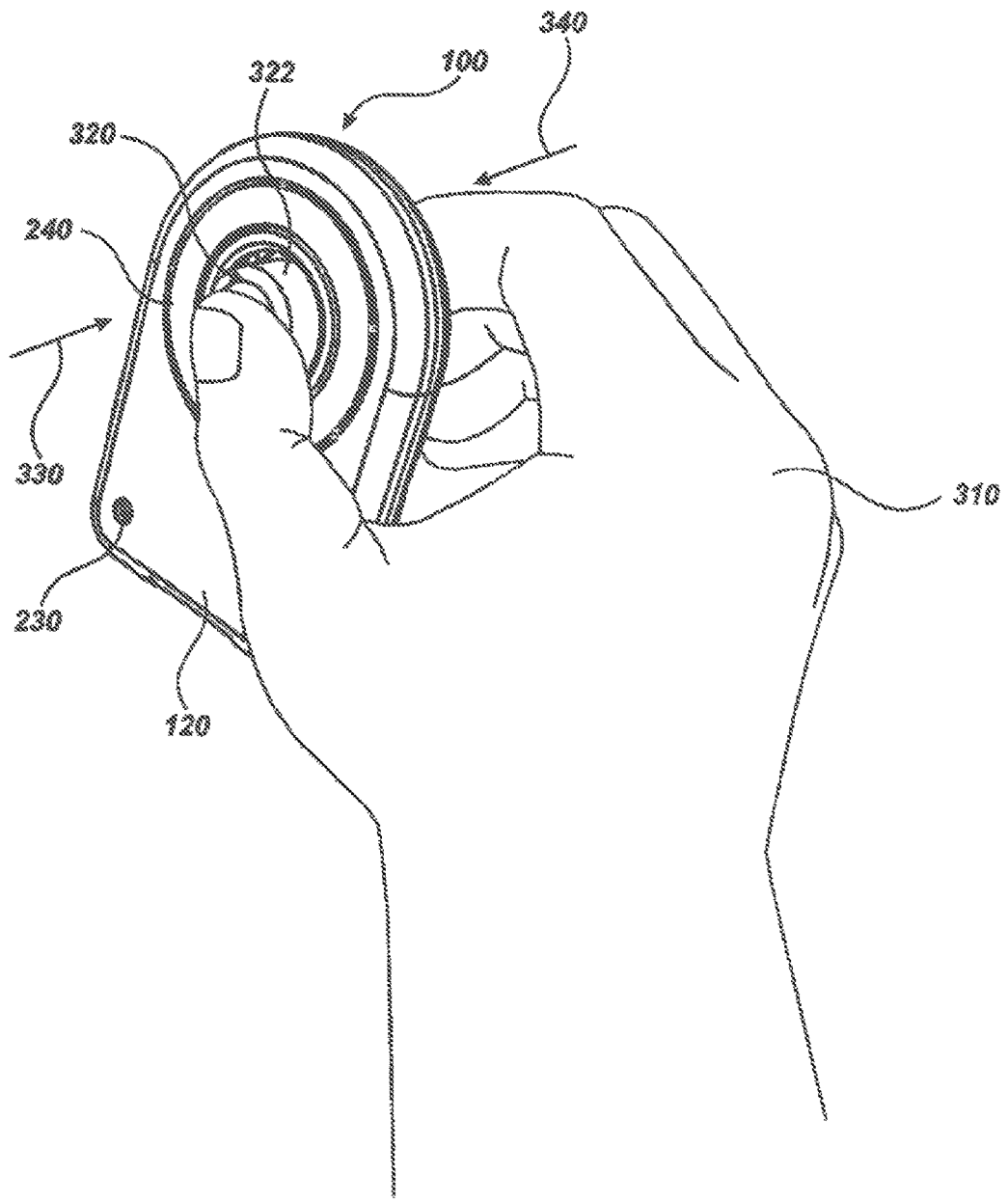
FIG. 3 is an isometric view of the slim profile magnetic user interface device embodiment of FIG. 1 being gripped by the digits of a user's hand.

FIGS. 1-3 illustrate details of an exemplary embodiment of a slim or narrow profile magnetic manual user interface device 100 (also denoted herein as a slim user interface device, slim profile magnetic UID, slim profile UID, or simply a slim UID).

As illustrated, slim UID 100 includes a housing or case structure comprising two components (i.e. a front and back piece) defining a front face and a back face, along with a narrow profile dimension. Front case piece 110 and back case piece 120 define opposite sides or faces of the housing for gripping between digits of a user's hand, such as a thumb and forefinger, with contact surfaces on the opposite faces used for receiving user input at an actuator assembly. For example, a front contact surface 130, in the form of a user cap as shown in embodiment 100, may be positioned as shown in FIG. 1 to receive input from a user's finger or thumb (with a corresponding surface on an opposite side or face, such as shown in FIG. 3).

Although example embodiment 100 includes a housing having two components, other embodiments may include a one piece housing or case, or may have a case including more than two components (e.g., separate side components, top or bottom components, etc.), which may be attached, connected, or bonded together to define a front and back face, where user input may be received at an actuator assembly.

Slim UID embodiments generally have a substantially flat profile in two dimensions (e.g., in the two dimensions, height and width, as shown in FIG. 1), with a slim, elongated depth dimension (as shown in FIG. 2) to allow a user to grip the device and control an actuator assembly with a thumb of a single hand while making contact with contact surfaces on opposite sides or faces of the actuator assembly (as shown in FIG. 3) using other digits and/or the palm or other hand surface.

In slim UID embodiment 100, outward facing surfaces of the front case piece 110 and the back case piece 120 (as shown in FIG. 2) are configured to be substantially flat and rectangular in shape, with one end rounded to form a semicircle as shown. In other embodiments, the surfaces may include contours or other shaping to enhance user interaction and actuator control, while including a slim dimension to allow two-sided user contact and interaction. For example, in some embodiments, one or both surfaces may include a raised contoured surface, such as for aiding palm contact, and the housing and/or contact surface may also have texturing and/or other tactile elements or shapes. In addition, the housing shaping need not be primarily rectangular as shown, but may include angled and/or curved sides or other surface shapes.

One or more printed circuit boards (PCBs), such as housing or case PCB 140 and actuator PCB 460 (described subsequently herein, in FIG. 4), may be included in a slim UID to mount components such as one or more magnets, one or more processing elements, memory devices, magnetic sensors, inertial sensors, analog or digital electronic components, switches, optical components, mechanical components, and/or other components, as well as to position magnets and magnetic sensor elements relative to the case or housing and actuator assembly disposed therein. In a typical embodiment, housing PCB 140 may include one or more magnetic sensors as well as one or more processing elements, and actuator PCB 460 may include one or more magnets. As noted previously, the magnets and magnetic sensors may be reversed, and processing elements and other circuitry, such as analog or digital circuits, additional sensor elements, connectors, and/or other circuits may be disposed on PCB 140, PCB 460, and/or both.

Processing elements used in a slim UID device, such as embodiment 100 as shown, may include, for example, a microcontroller such as the commercially available NXP LCP2366 microcontroller or other microprocessors or microcontrollers, digital signal processors (DSPs), programmable devices, memories, analog and/or digital components, such as I/O components, ASICs, logic devices, signal conditioning components, and/or other electronic components. The processing element may be coupled, either directly or through interface circuitry, to outputs of the magnetic sensors and/or other sensors, such as inertial sensors, to receive analog or digital output signals from the sensors corresponding to positions and/or movements of the magnets or other sensor elements in response to user actuations, as well as to sense other parameters related to conditions or inputs to the slim UID.

FIG. 2 illustrates details of an embodiment of a slim UID case or housing assembly 200 including two primary housing components, a front and a back piece, along with connecting screws and a screw cover. Front case piece 110 may be formed with a front actuator hole 212 and, along an internal surface, a series of front mounting nubs 214. A connector groove 216 may also be formed between the two corners of the front case piece 110 to allow for pass through of a cable or wiring connector (not shown), which may be coupled to connector 150 as shown in FIG. 1.

A back case piece 120 may be formed with a series of screw holes 222 and a back actuator hole 224. In the embodiment shown, six screw holes 222 are formed on the back case piece 120, with four of the screw holes 222 formed within a ring-shaped indention 226 that circumscribes the back actuator hole 224, and the remaining two screw holes 222 formed near the bottom two corners of the back case piece 120. Other embodiments may include fewer or more screw holes 222, which may be in alternate positions to those shown in embodiment 200, and/or other attachment mechanisms such as adhesive or snap-together elements or other connection mechanisms may be used to secure the front and back case pieces.

A series of back mounting nubs 228 may be formed along the internal facing surface of the back case piece 120 that, in assembly, align with the front mounting nubs 214 and the screw holes 222. The front case piece 110 and the back case piece 120 may be secured together by screws 230, and a ring-shaped screw cover 240 may be secured with adhesive or other attachment mechanisms to the back casing piece 120 to cover the screws 230 within an indentation for positioning an actuator assembly, which may be formed as a ring-shaped indention 226 or other indentation matching the actuator element.

As noted previously, a slim UID case, such as case embodiment 200, is generally configured with a greater height and width than depth so as to accommodate a user's hand. An example interaction between a user's hand 310 and device embodiment 100 is shown in FIG. 3. In this example, a thumb and a forefinger of the user's hand 310 are in contact with contact element 322 and contact element 130 (not shown in FIG. 3), disposed on opposite sides of an actuator assembly 320.

In various embodiments, slim UIDs may include an actuator assembly having contact surfaces on contact elements disposed on the front and back sides, along with one or more magnets and an actuator support assembly, which may include structural elements as well as circuit elements, such as elements on an actuator PCB, such as actuator PCB 460. The magnets may be used to generate magnetic field signals which may then be sensed during user movement of the actuator, using a fixed magnetic sensor. Conversely, in an alternate configuration, magnetic sensor(s) may be disposed on the actuator assembly and the magnet(s) may be disposed in a fixed position, such as on or in the case or housing. The actuator support assembly includes components configured to support contact elements of the actuator assembly and allow movement of the actuator assembly relative to the housing.

For example, in operation, a user may press on and/or move the front contact surface, back contact surface, or typically both surfaces of the actuator assembly with a thumb and forefinger to interact with the slim UID, such as shown in FIG. 3. Movement of the actuator may be sensed by magnetic sensors with sensor output signals then processed to generate output signals, such as command or control signals for use by an electronic computing system.

Figure 4:
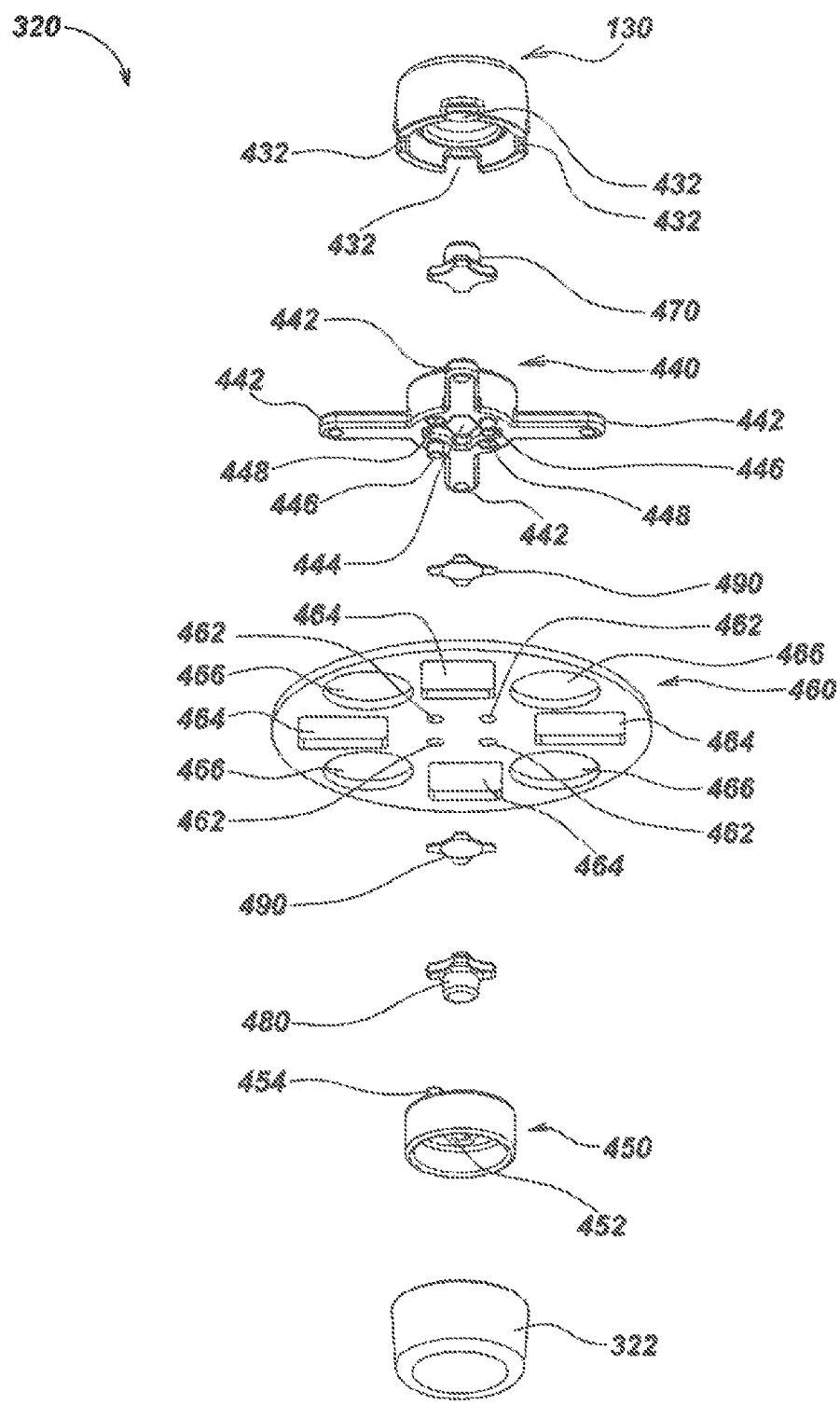
FIG. 4 is a detailed exploded view of an actuator assembly of the slim profile magnetic user interface device embodiment of FIG. 1 taken from below.
Figure 5:
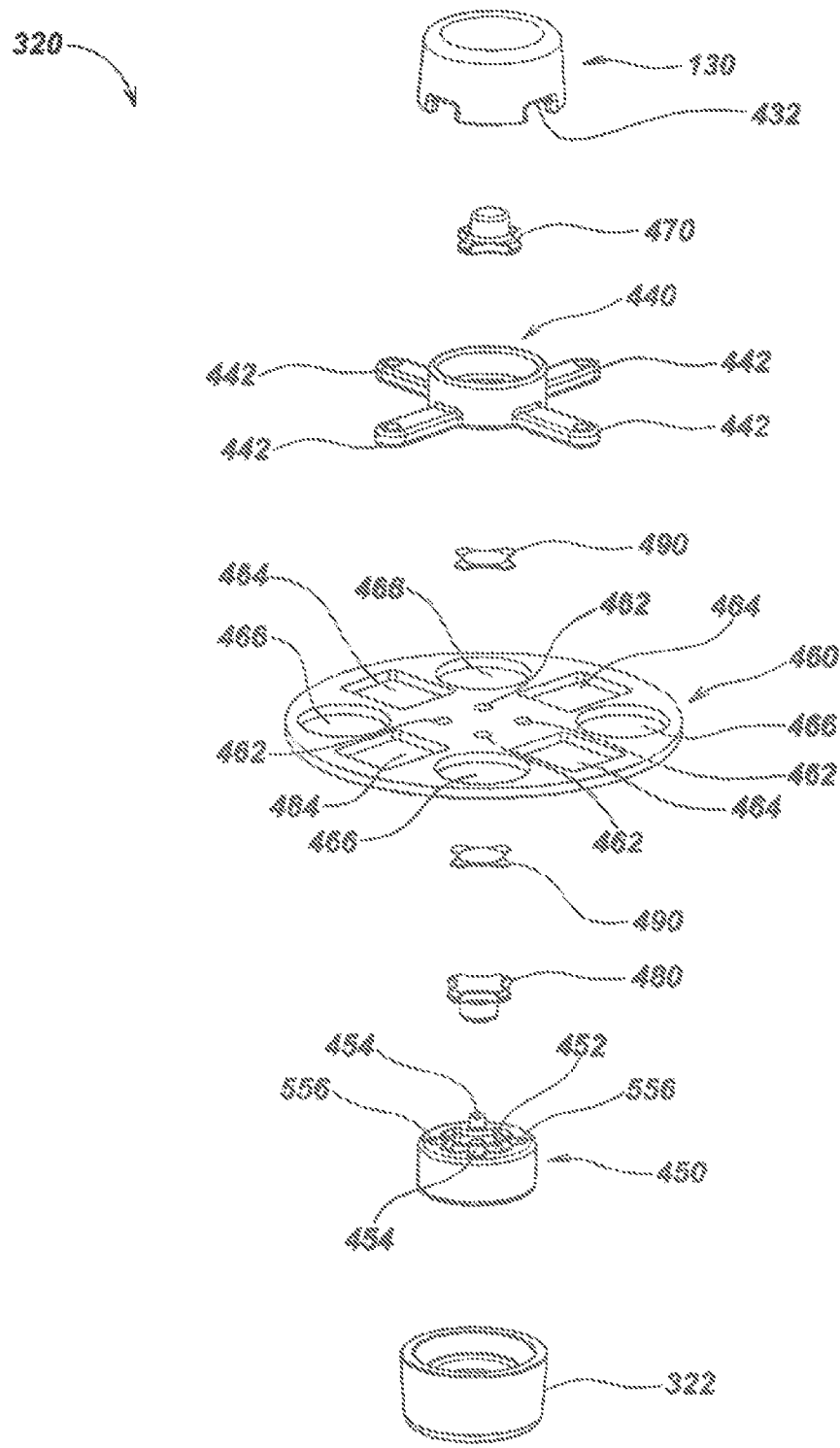
FIG. 5 is a detailed exploded view of an actuator assembly of the slim profile magnetic user interface device embodiment of FIG. 1 taken from above.

Examples of embodiments of front and back contact elements are illustrated in FIGS. 4 and 5. For example, as shown in FIG. 4, actuator assembly 320 includes, as a front contact element, a front actuator cap 130, and as a corresponding back contact element, a back actuator cap 322. These caps may be formed in a substantially cylindrical shape as shown or may be configured in other shapes, such as spherical, square-shaped, or other shapes configured to aid in user contact and tactile interaction with the slim UID using digits of the user's hand.

The front actuator cap 130 and the back actuator cap 322 may be made from a tactile material, such as an elastomeric material, so that they are both pliable and provide additional grip to the user's hand 310 during interactions such as shown in FIG. 3.

To connect with other elements of the actuator assembly, the front actuator cap 130 may also be formed with a keying structure, such as a series of notches 432, ribs (not shown), or other keying structures formed about an inward-facing side relative to the housing. The front actuator cap 130 may be further formed to be bonded or overmolded onto an actuator support assembly that may include front actuator support 440, and the back actuator cap 322 may be correspondingly formed to be bonded or overmolded onto a back actuator support 450. The back and sides of the front actuator support 440 and the back and sides of the back actuator support 450 may be sized and shaped to be enclosed or coupled to the front actuator cap 130 and the back actuator cap 322, respectively.

In an exemplary embodiment, the front actuator support 440 may be formed with a series of arms 442 and a front X-shaped recess 444. When assembled, each one of the notches 432 may fit around corresponding ones of the arms 442 of the actuator support 440. As shown in embodiment 100, four arms 442 are formed about the bottom of the cylindrical section and evenly spaced about the circumference of the front actuator support 440 so that each of the arms 442 extends in the direction away from the center axis of the cylindrical section of the front actuator support 440. Other numbers and/or spacing of arms 442 or similar or equivalent elements may alternately be used in various embodiments.

The front X-shaped recess 444 may be formed through the center axis of the front actuator support 440. A corresponding back X-shaped recess 452 may similarly be formed through the center axis of the back actuator support 450.

A series of front actuator prongs 446 and a series of front actuator cavities 448 may be formed about the inward facing sides of the front actuator support 440. A series of back actuator prongs 454 and a series of back actuator cavities 556 (as shown in FIG. 5) may similarly be formed about the inward facing sides of the back actuator support 450. In assembly, the front actuator prongs 446 may be configured to snap securely into the back actuator cavities 556, and the back actuator prongs 454 configured to snap securely into the front actuator cavities 448. The system of prongs and cavities may be used to create an attachment mechanism to secure the front actuator support 440 and the back actuator support 450 together. In other embodiments, different attachment mechanisms, such as screws, adhesives or other bonding, or other attachment mechanisms may alternately be used.

Once signals generated from a magnetic sensor element are processed in a processing element of a slim UID and corresponding output signals are generated, output data, such as commands or control data, and/or other information, may be transmitted from the processing element to an electronic computing system, such as via connector 150 (as shown in, for example, FIG. 1) as a wired signal. Details of example processing functions as may be performed in a processing element are described in, for example, U.S. Provisional Patent Application Ser. No. 61/525,755, filed Aug. 20, 2011, entitled USER INTERFACE DEVICE METHODS AND APPARATUS USING PERMANENT MAGNETS OR ELECTROMAGNETS AND CORRESPONDING MAGNETIC SENSORS, and U.S. Utility patent application Ser. No. 13/214,209, filed Aug. 21, 2011, entitled MAGNETIC SENSING USER INTERFACE DEVICE METHODS AND APPARATUS, the content of which are incorporated by reference herein in their entirety. In alternate embodiments, output signals may be provided via wireless signaling, optical signaling, or other signaling methods.

As shown in FIG. 4, actuator PCB 460 may be formed with a series of securing holes 462 for the front actuator prongs 446 and the back actuator prongs 454 to pass through, thereby securing the center PCB 460 between the front actuator support 440 and the back actuator support 450. Other methods of coupling elements of the actuator support assembly, such as screws, adhesives, or other attachment mechanisms may be used in place of or in addition to the attachment mechanism shown in FIG. 4. As shown in FIG. 4, four securing holes 462 are located near the center of the actuator PCB 460; however, other numbers and/or positioning of securing holes may alternately be used in various embodiments.

In an exemplary embodiment, center PCB 460 is substantially round in shape (or otherwise shaped to conform to the shape of the housing and/or actuator assembly) and may include a series of sensor holes 464 and a series of mounting nub gaps 466 formed in positions that are evenly spaced between each other. Other embodiments may alternately include different numbers and/or positions of holes as well as different PCB shapes and/or sizes. Sensor holes 464 may be square in shape as shown and may be positioned between the mounting nub gaps 466. Alternately, other shapes and/or positions of sensor holes may be used in various other embodiments.

Mounting nub gaps 466 may be round in shape and may be positioned between the sensor holes 464 so that the sensor holes 464 and the mounting gaps 466 alternate in position around the actuator PCB 460. Other embodiments may alternately include different numbers and/or positions of holes. When assembled, the front mounting nubs 214 of the front case piece 110 and the back mounting nubs 228 of the back case piece 120 may couple together within the mounting nub gaps 466. The mounting nub gaps 466 may be sized so that displacements of the center PCB 460 may be made about the front mounting nubs 214 and the back mounting nubs 228. By controlling the size of the mounting nub gaps 466, the amount of travel made by the actuator assembly 320 during user actuation may be controlled.

A slim UID may include one or more switching elements to allow a user to provide switching inputs in addition to motion inputs. For example, to facilitate switch contact, a front dome switch punch element 470 may be positioned within the front X-shaped recess 444 of the front actuator support 440, and a back dome switch punch element 480 may be positioned within the back X-shaped recess 452 of the back actuator support 450. The punch elements may be used to transfer user input to a separate switch, such as a dome switch or other switch type. Alternately, in some embodiments, one or more switches may be positioned for direct user contact.

The front dome switch punch element 470 and the back dome switch punch element 480 may be cylindrical on one end and X-shaped about the inward facing end. Other embodiments may have different shapes and/or sizes of punch elements tailored to allow efficient transfer of user switching inputs to corresponding switches.

A pair of mechanical dome switches 490 (as shown in FIG. 5) may be used to receive user switch inputs. The switches may, for example, be mounted centrally, with one on each side of the actuator PCB 460 as shown. The switches may be aligned between the front dome switch punch element 470 and the back dome switch punch element 480. When sufficient force is applied along a direction 330 (as shown in FIG. 3) and/or an opposite direction 340, simultaneously, the mechanical dome switches 490 will actuate, thereby providing the user with tactile feedback in the form of a click. In other embodiments, different numbers and/or positioning of switches and corresponding elements, such as punch elements, may be used.

One or more electrical contact points (not shown) may also be used in conjunction with the mechanical dome switch 490 to signal to a processing element (not shown) a pushbutton switch input from a user. A force-sensing resistor or other force sensing mechanism (not shown) may also be used to measure a squeezing action applied to the actuator assembly 320. This may be used to signal particular commands to be generated by the processing element. For example, a squeezing action applied to the actuator assembly 320 may be processed by the processing element to generate an output signal or command indicating picking up of a virtual object. The mechanical dome switches 490 should preferably be selected to be sufficiently rigid so that any incidental actuation of the mechanical dome switches 490 does not result in undesired output signals.

In some embodiments a vibrational element, such as, for example, is described in U.S. Utility patent application Ser. No. 131/110,910, filed May 18, 2011, entitled USER INTERFACE DEVICES, APPARATUS, AND METHODS, incorporated by reference herein, may be used. The vibrational element may be, for example, a vibration motor, piezoelectric device, or other motion or vibration generation device configured to provide tactile user outputs in response to user inputs, such as from particular motions and/or switch actuations, and/or in response to signals provided from a coupled electronic computing system to the slim UID. The vibrational element may be coupled to and controlled by the processing element and/or additional circuit elements and may be disposed on or in the actuator assembly, and/or in some embodiments on or in the case or housing assembly.

Referring to FIGS. 6-10, additional details of slim UID embodiment 100 are illustrated. For example, front actuator support 440 may be seated within front actuator hole 212 of front case piece 110 so that the top of front actuator support 440 and front actuator cap 130 protrude from within front actuator hole 212 and beyond the outer surface of the front case piece 110. Similarly, back actuator support 450 may be seated within back actuator hole 224 of the back case piece 120 so that the top of back actuator support 450 and the back actuator cap 322 protrude from the back actuator hole 224 and beyond the outer surface of the back case piece 120.

In a typical slim UID embodiment, the actuator assembly includes one or more magnets, which may be permanent magnets or, in some embodiments, electromagnets controlled by a corresponding electromagnet control circuit element. For example, permanent magnets 610 may be mounted at or near the outermost end of each of the four arms 442 of the front actuator support 440 as shown. In other embodiments, different numbers and/or positions of magnets may be used.

Each of the magnets 610 may correspond to a magnetic sensor 620, such as the Melexis MLX90333 Triaxis 3D-Joystick Position sensor, or other two or three axis magnetometers-type sensors, which may be mounted to PCB 460. For example, in some embodiments Melexis MLX90333 or Melexis MLX90363 sensors may be used, or other sensors, such as the BLBC3-B CMOS 3D Compass sensors from Baolab Microsystems, or other magnetic sensors as are known or developed in the art, may be used. Further details regarding embodiments using Melexis sensors may be found in U.S. patent application Ser. No. 12/756,068, filed Apr. 7, 2010, entitled MAGNETIC MANUAL USER INTERFACE DEVICES, the content of which is incorporated by reference herein. As noted previously, the positioning of magnets and sensors may be reversed in alternate embodiments.

Housing PCB 140 may be shaped to fit flush along the internal surface of the back case piece 120. As shown in FIG. 1, PCB 140 may include one or more connectors, such as electrical connector 150 (and/or other connectors, such as optical connectors, or wireless communication elements or modules, etc.). For example, along an end of housing PCB 140, opposite that containing the magnetic sensors 620, an electrical connector 150 may be mounted. The electrical connector 150 may be exposed by connector groove 216 of the front case piece 110. In an exemplary embodiment, the electrical connector 150 may be a ten pin connector used to connect slim UID embodiment 100 to an electronic computing system using wired or wireless connections (not shown). For example, in addition to wired connections, other methods of transmitting data may also be used, such as wireless transmitters or transceiver modules when an appropriate power source, such as a battery or separate power supply connection, is provided to the slim UID.

In order to restore the actuator assembly to a released state position absent user input, one or more position restoration elements, such as a spring assembly or other flexible elements, may be used. For example, in an exemplary embodiment as shown in FIGS. 6-10, the spring assembly includes a series of conical springs 630 that may be mounted to the actuator PCB 460 so that four of the conical springs 630 are on one side of the actuator PCB 460 and the other four of the conical springs 630 are mounted to the opposite side of the actuator PCB 460. The wider end of each of the conical springs 630 may be mounted to the actuator PCB 460, while the narrower end facing the front case piece 110 may be mounted to the front case piece 110 at one of the front mounting nubs 214. The narrower end of the other four of the conical springs 630 facing the back case piece 120 may each be mounted to the back case piece 120 at one of the back mounting nubs 228. Other sizes, numbers, shapes, and/or positions of the springs and/or other elements may be used in various embodiments.

In embodiments utilizing force-sensing resistors or electrical contact points, which may be disposed beneath switches such as mechanical dome switches 490, conical springs 630 (or other conductive materials) may be used for carrying signals between actuator PCB 460 and a processing element, which may be mounted on housing PCB 140. As shown in embodiment 100, the springs 630 may be used to provide an electrical connection between switches or other electrical circuit elements on or connected to actuator assembly PCB 460 to housing PCB 140 and sensors 620 (e.g., the springs may provide an electrically conductive connection between actuator PCB 460, which may mechanically "float" relative to the housing or case, and housing PCB 140 which may be fixed relative to the housing or case). The springs 630 may be retained by a post or other structural element, such as a post disposed within an inside diameter of the spring, with one end in contact with pads, soldered, or attached via other connective element on one face of housing PCB 140, such as by the force of spring pressure, and the other end in contact with pads, solder, or other connective elements of actuator PCB 460.

In some embodiments, an alternate electrically conductive pathway between circuit board or circuit elements, such as a flexible circuit element, wiring, or other connection mechanism may be used. In some embodiments, a processing element may be disposed on PCB 140, PCB 460, or processing elements may be disposed on both or elsewhere in or on the housing or actuator assembly.

In comparison to other spring geometries, conical springs lay flat when compressed, affording the actuator assembly 320 and the slim profile magnetic user interface device 100 a slim profile as shown. As such, slim UID embodiments are suited to, among other applications, providing a user control mechanism for a variety of portable electronic devices, as well as other devices where size, positioning, and/or shape of user interface elements are important.

Figure 6:
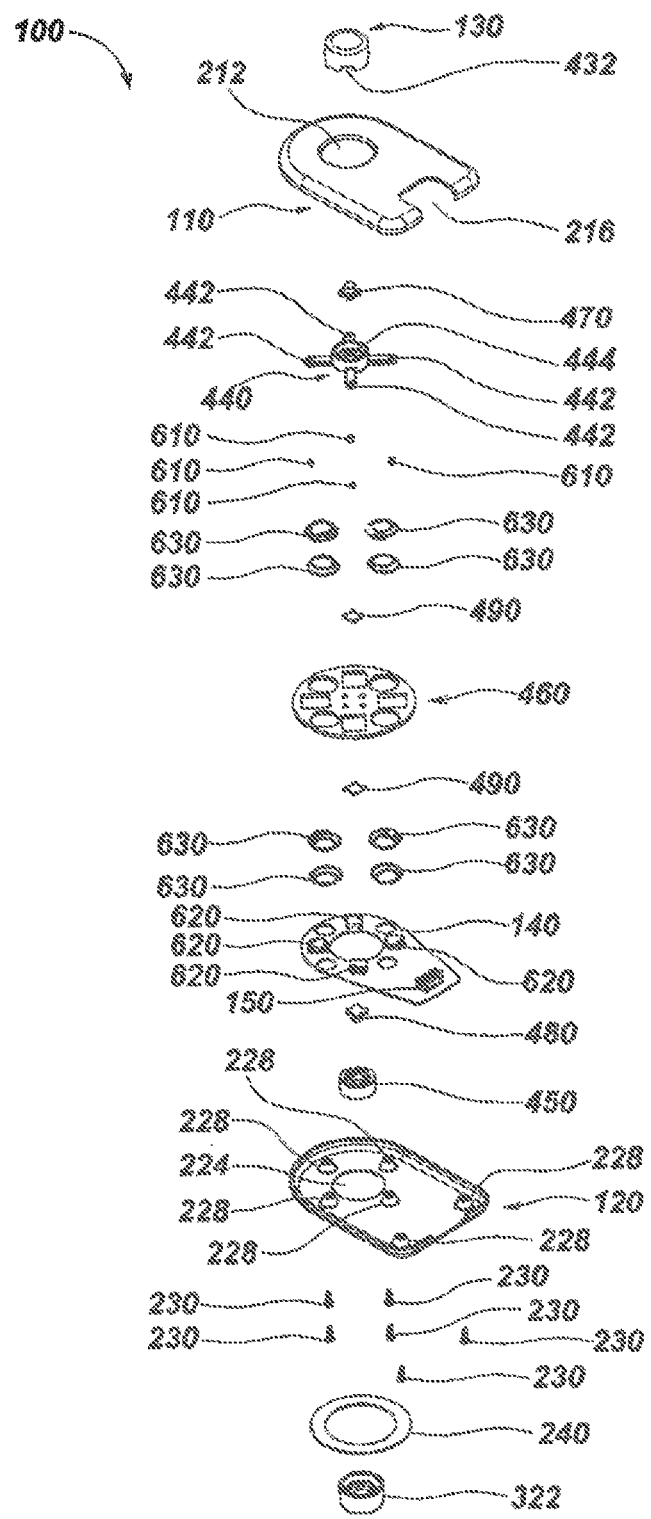
FIG. 6 is a reduced exploded view of the slim profile magnetic user interface device embodiment of FIG. 1 taken from above.
Figure 7:
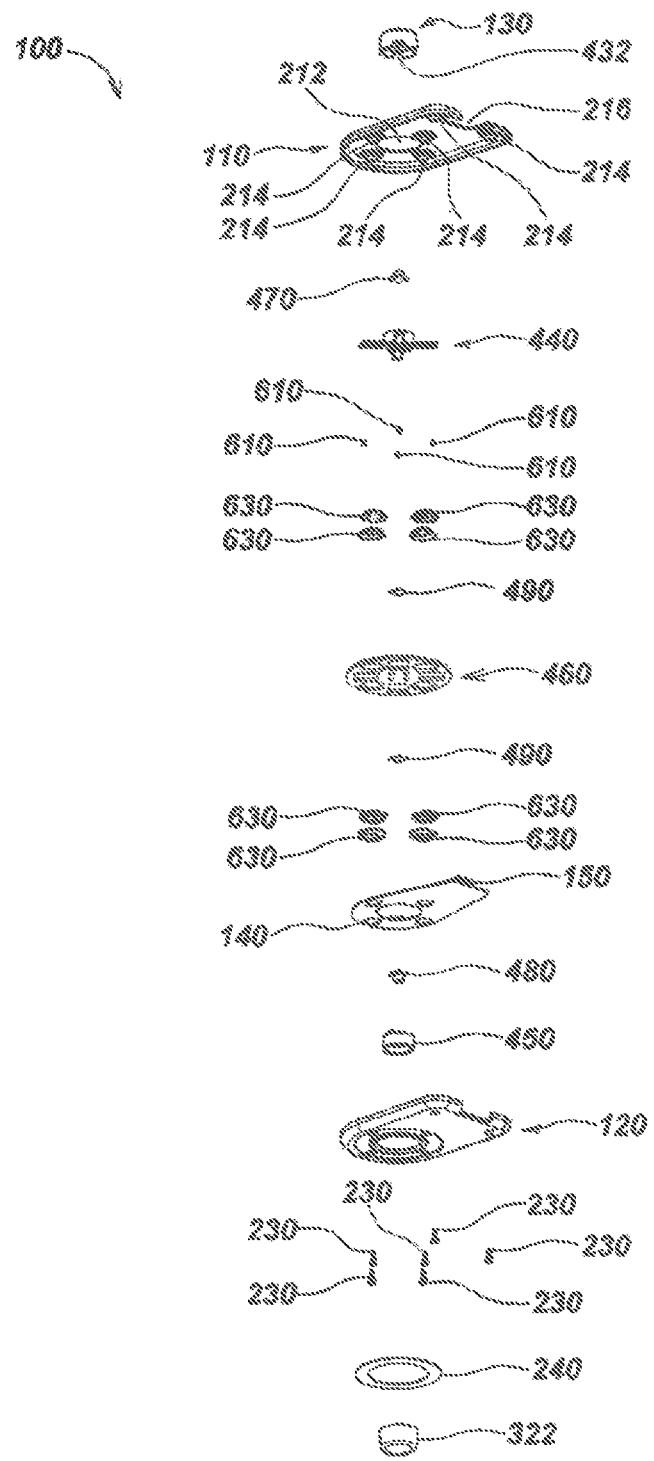
FIG. 7 is a reduced exploded view of the slim profile magnetic user interface device embodiment of FIG. 1 taken from below.
Figure 8:
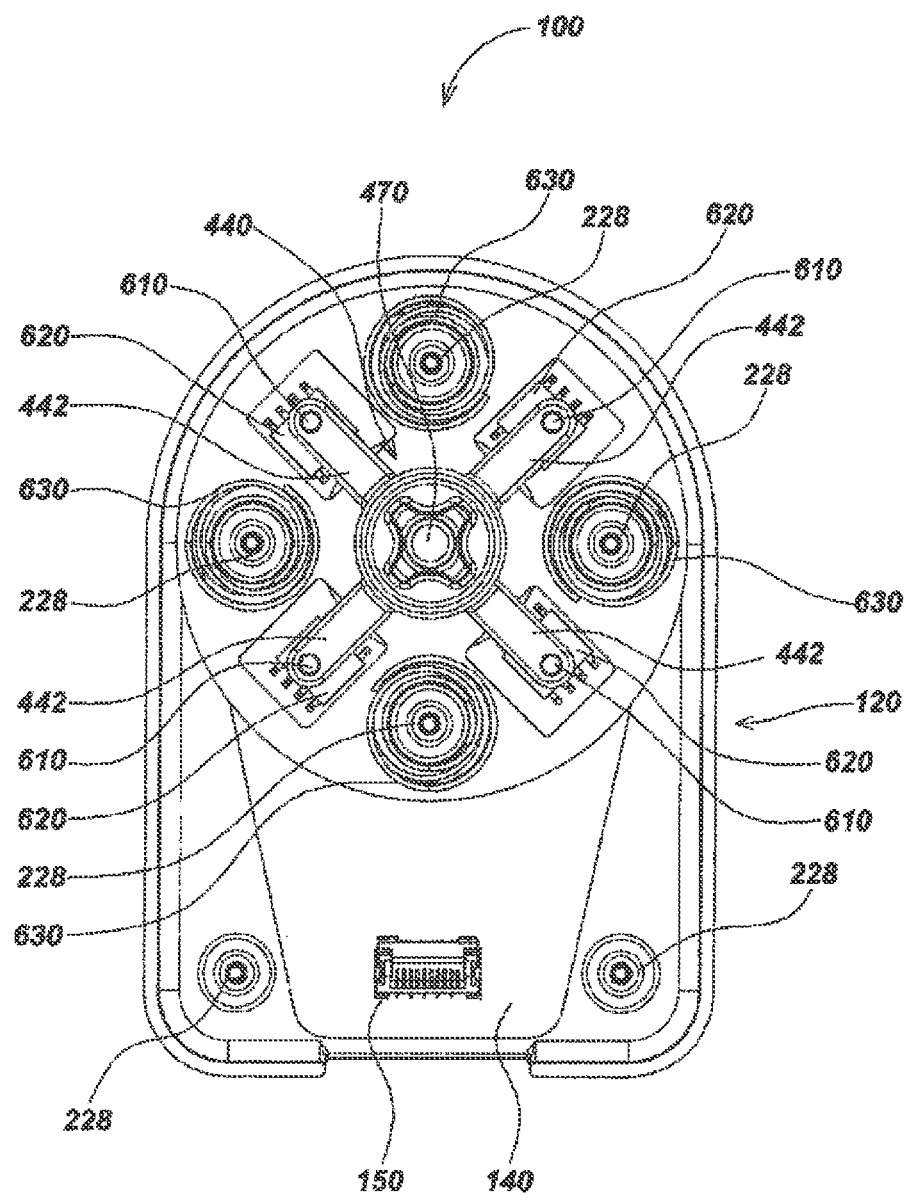
FIG. 8 is a front view of the slim profile magnetic user interface device embodiment of FIG. 1 with a front case piece and a front actuator cap, shown removed for purposes of illustration.
Figure 9:
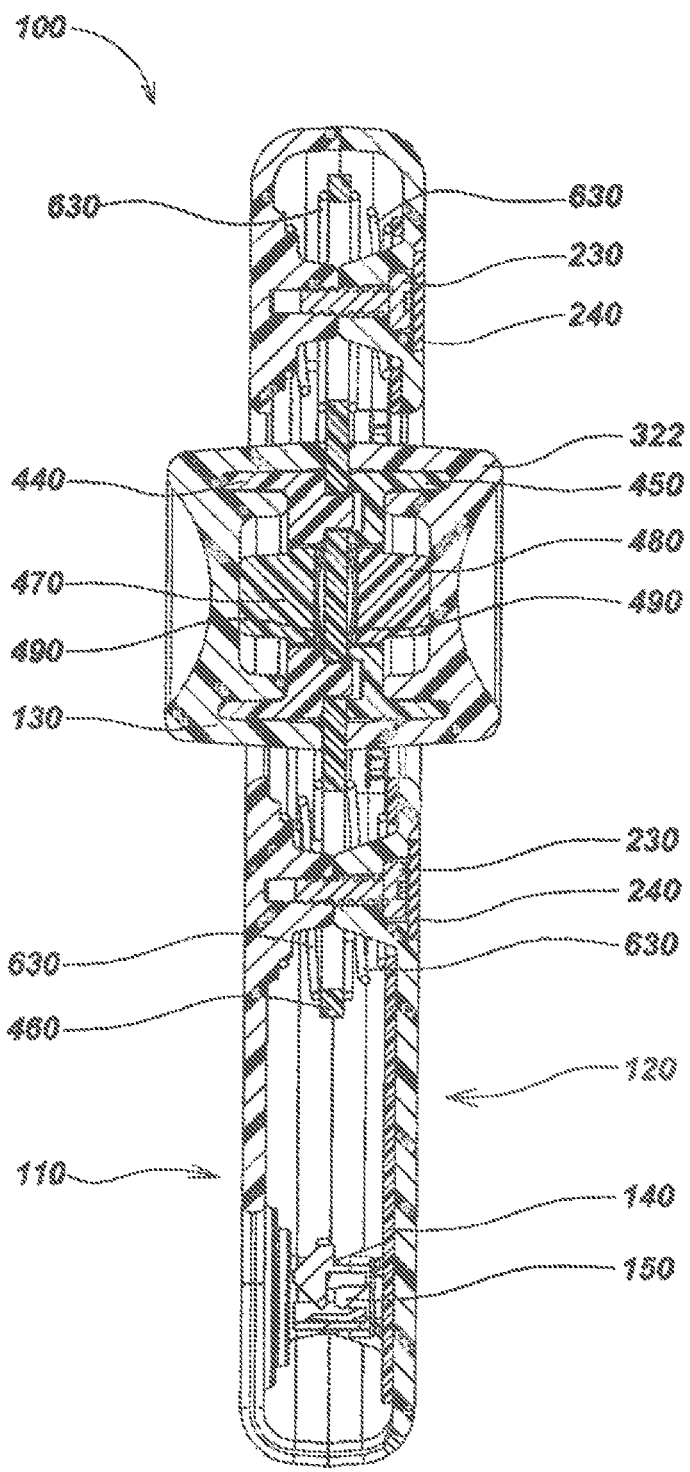
FIG. 9 is a sectional view of the of the slim profile magnetic user interface device embodiment of FIG. 1 along line 9-9.
Figure 10:
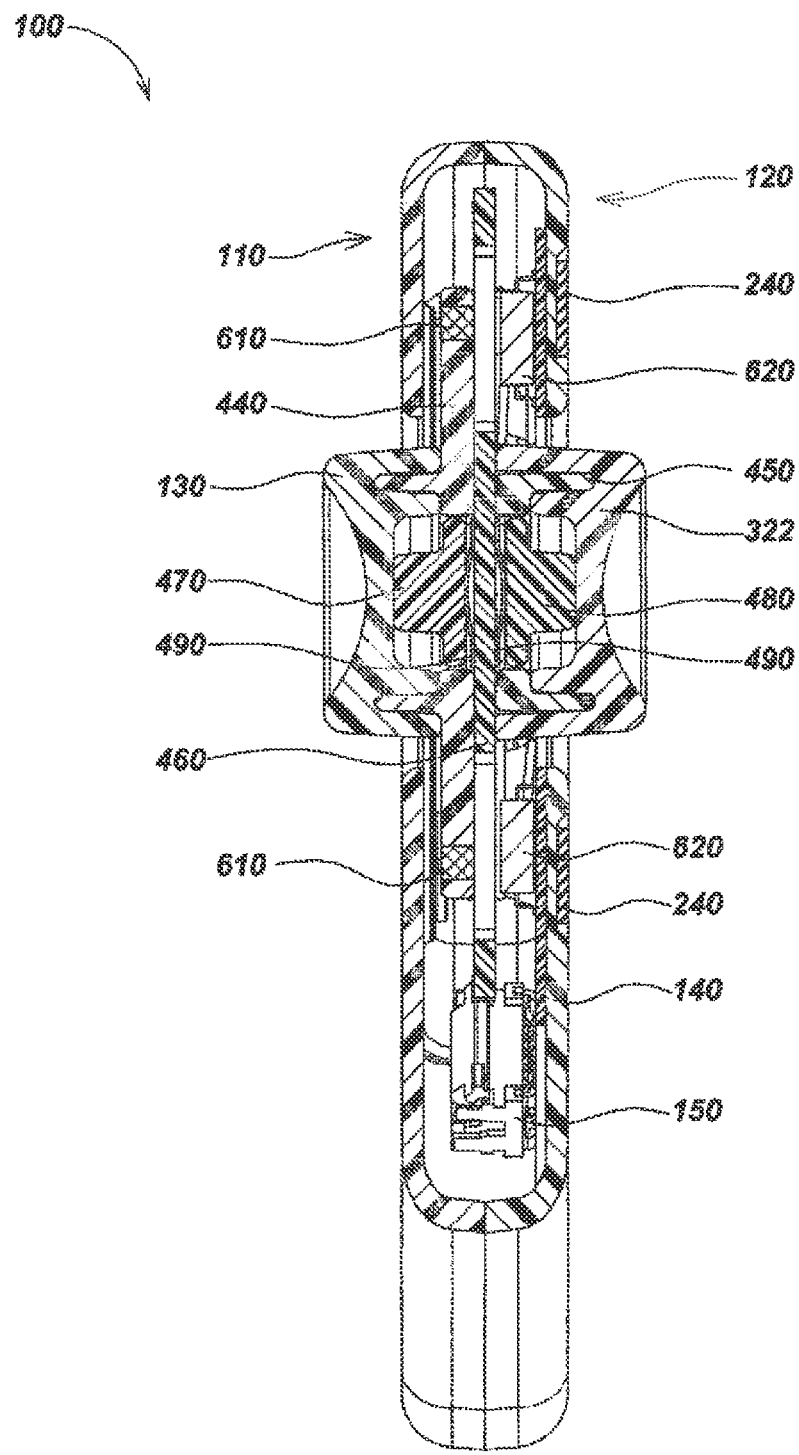
FIG. 10 is a sectional view of the slim profile magnetic user interface device embodiment of FIG. 1 along line 10-10.

As shown in, for example, FIG. 6, the magnetic sensors 620 and the magnets 610 may be positioned so that when the actuator assembly 320 is displaced from a released state, the magnetic sensors 620 generate sensor output signals in response to the displacement. As noted previously, the sensor output signals may then be provided to a processing element, where they may be used as inputs to generate commands to be provided to an electronic computing system as shown in example process diagram 1100 of FIG. 11. Examples of providing sensor output signals and corresponding processing in a processor element to generate output signals/commands are described in, for example, U.S. patent application Ser. No. 13/110,910, filed May 18, 2011, entitled USER INTERFACE DEVICES, APPARATUS, AND METHODS and U.S. patent application Ser. No. 13/214,209 filed Aug. 21, 2011, entitled MAGNETIC SENSING USER INTERFACE DEVICE METHODS AND APPARATUS.

For example, by tilting the actuator assembly 320 in one direction, the processing element may generate an output signal in a format appropriate to a corresponding electronic computing system (e.g., a USB, Firewire, etc.) and provide the output signal and corresponding data, such as command or control data, to the electronic computing system. As one example, if the electronic computing system is a computer aided design (CAD) system and a user provides an actuation input for rotation or movement, the processing element (and/or coupled output element) may generate a command or control signal, such as a USB command, to move or rotate an object in virtual space in an analogous direction.

The electronic computing system may then render a corresponding result on a display or other output device. The received command or input may also be used to manipulate data or other program objects or functions.

Figure 11:
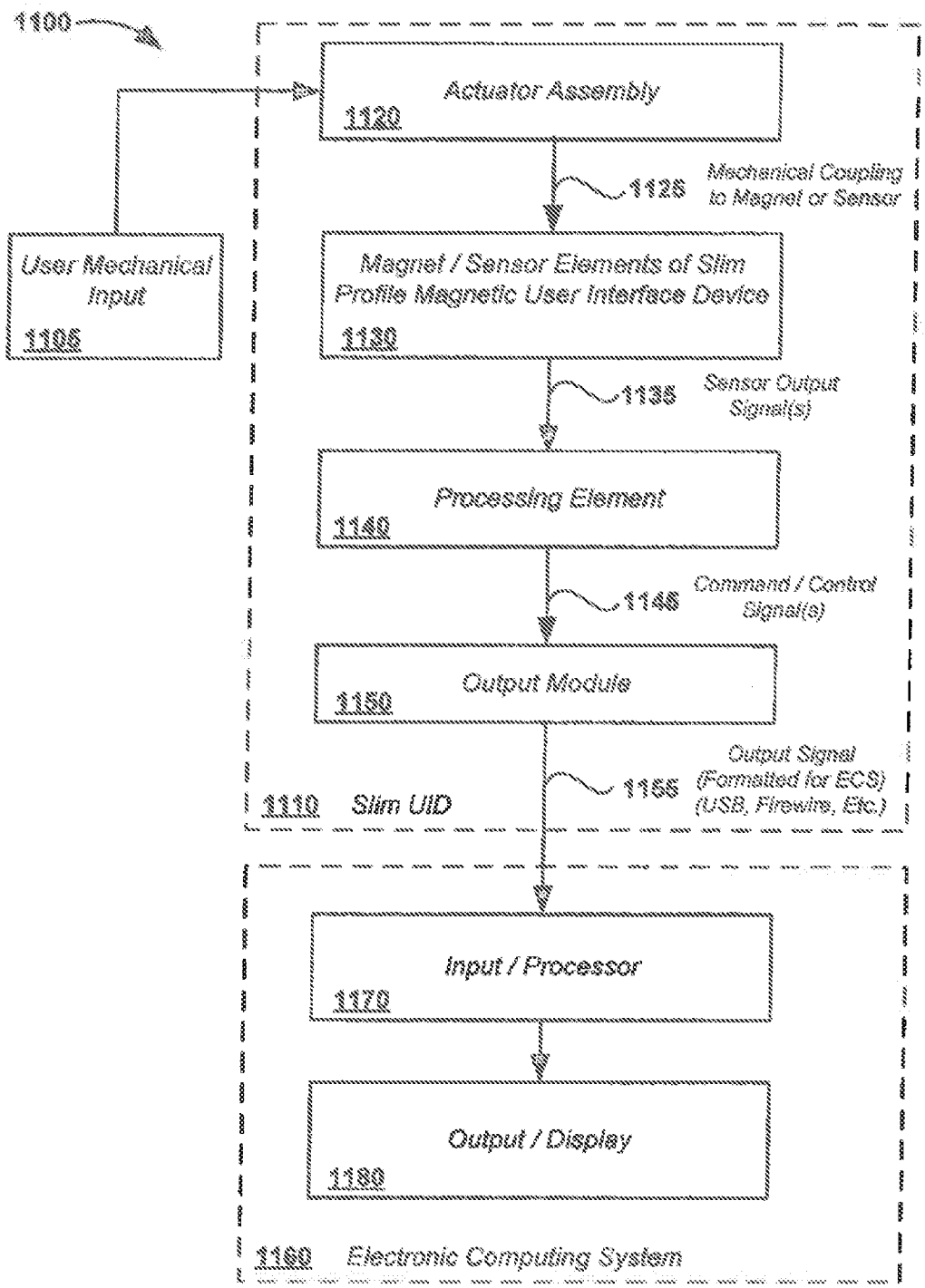
FIG. 11 is a block diagram showing an embodiment of components of a slim profile magnetic user interface device and corresponding user interaction and signal flow.

FIG. 11 illustrates an example flowchart of signaling as may be generated in and provided from a slim UID device, such as slim UID embodiment 100, in a system 1100. As shown in FIG. 11, system 1100 includes a slim UID device 1110, which may correspond with slim UID 100 of FIG. 1, as well as an electronic computing system 1160. Slim UID 1110 includes an actuator assembly 1120, which may correspond with actuator assembly 320, as well as a magnet and magnetic sensor element 1130, which may correspond with magnets 630 and magnetic sensors 620, along with a processing element 1140, which may be integral with or coupled with an output module 1150 configured to generate output signals from slim UID 1100 in an appropriate signaling format for electronic computing system 1160.

In operation, a user may move the actuator assembly at stage 1105 while in contact with opposing contact elements of actuator assembly 1120, which may be mechanically coupled 1125 with one or more magnets or, in some embodiments, one or more magnetic sensors. The magnetic sensors then generate sensor signals 1135 which are then provided to processing element 1140 for processing to generate, based at least in part, on the user actuation(s). Command/control data or signals 1145 may then be generated by processing element 1140 and may be provided directly or via on output module 1150 as an appropriately formatted output signal 1155 to the electronic computing system 1160. In electronic computing system 1160, the command/control data or information may then be used as an input signal to one or more microprocessors 1170 and coupled memory to perform processing actions typical to user input devices. For example, as described previously, the user actuation may signal an interaction with a virtual object, such as in a game or CAD system, with the resulting motion, rotation, etc., then rendered as an output on a display or other output device 1180.

Example electronic computing systems 1160 may include, but are not limited to: video or computer gaming console systems, personal computers (PC), robotic devices, cellular or smart phones, tablet devices, graphical art and design systems such as computer aided design (CAD) systems, computer-controlled tools or equipment, computerized instrumentation or control systems, or other similar devices or systems. In addition, as noted previously, one or more switches or other input control elements may be used in conjunction with the actuator motion inputs to provide additional pushbutton-type controls in some embodiments of slim profile UIDs.

In an exemplary embodiment, magnets, such as permanent magnets 610, of slim profile magnetic user interface device embodiment 100 are relatively small (with respect to the slim UID device) and may be positioned close to corresponding ones of the magnetic sensors, such as magnetic sensors 620. As the magnets 610 are axially magnetized, it may be advantageous to limit the mounting distance between each of the magnets 610 and the corresponding one of the magnetic sensors 620 to less than four magnet diameters when the slim profile magnetic user interface device 100 is in a released state.

Although the example embodiment 100 includes round-shaped magnets 610, if the magnets are not round in shape, the mounting distance may be measured at a right angle to the dipole axis of the magnets. When increasingly larger ones of the permanent magnet 610 are used, the magnetic sensors 620 may become more susceptible to measurement saturation of the magnetic field components. As the magnetic sensor 620 becomes saturated with the magnetic fields, subtle movements of the actuator assembly 320 and the permanent magnets 610 become less distinguishable by the processing element 1110, lessening the degree of sensitivity to such movements. However, larger magnets and positioning may be useful in extending movement range and/or other operational parameters.

When the permanent magnets 610 are positioned further from the magnetic sensors 620, the relative magnitude of each magnetic field will fall off approximately as the inverse power of three. Consequently, measurements of the magnitude and direction of the magnetic field components may become increasingly difficult to derive as the magnetic sensors 620 are positioned further from the permanent magnets 610.

Returning to FIGS. 1-4, a magnetic sensor, which may be, for example, a commercially available Melexis MLX90333 or Melexis MLX90363 sensor, the BLBC3-B CMOS 3D Compass sensors from Baolab Microsystems, or other magnetic sensors as are known or developed in the art, may be mounted to the housing PCB 140. The magnetic sensor may be mounted so that it is enclosed by sleeve disk-shaped spring-retaining base section of the bottom spring-retaining sleeve 130. Details regarding various magnets and magnetic sensors and associated device configurations are described in, for example, U.S. patent application Ser. No. 13/110,910, filed May 18, 2011, entitled USER INTERFACE DEVICES, APPARATUS, AND METHODS, the content of which is incorporated by reference herein. Although certain commercially available sensors are referenced herein, other types of magnetic sensors besides the Melexis MLX90333 Hall effect sensor may also be used including, but not limited to, GMR sensors and InSb magnetoresistors.

Figure 12:
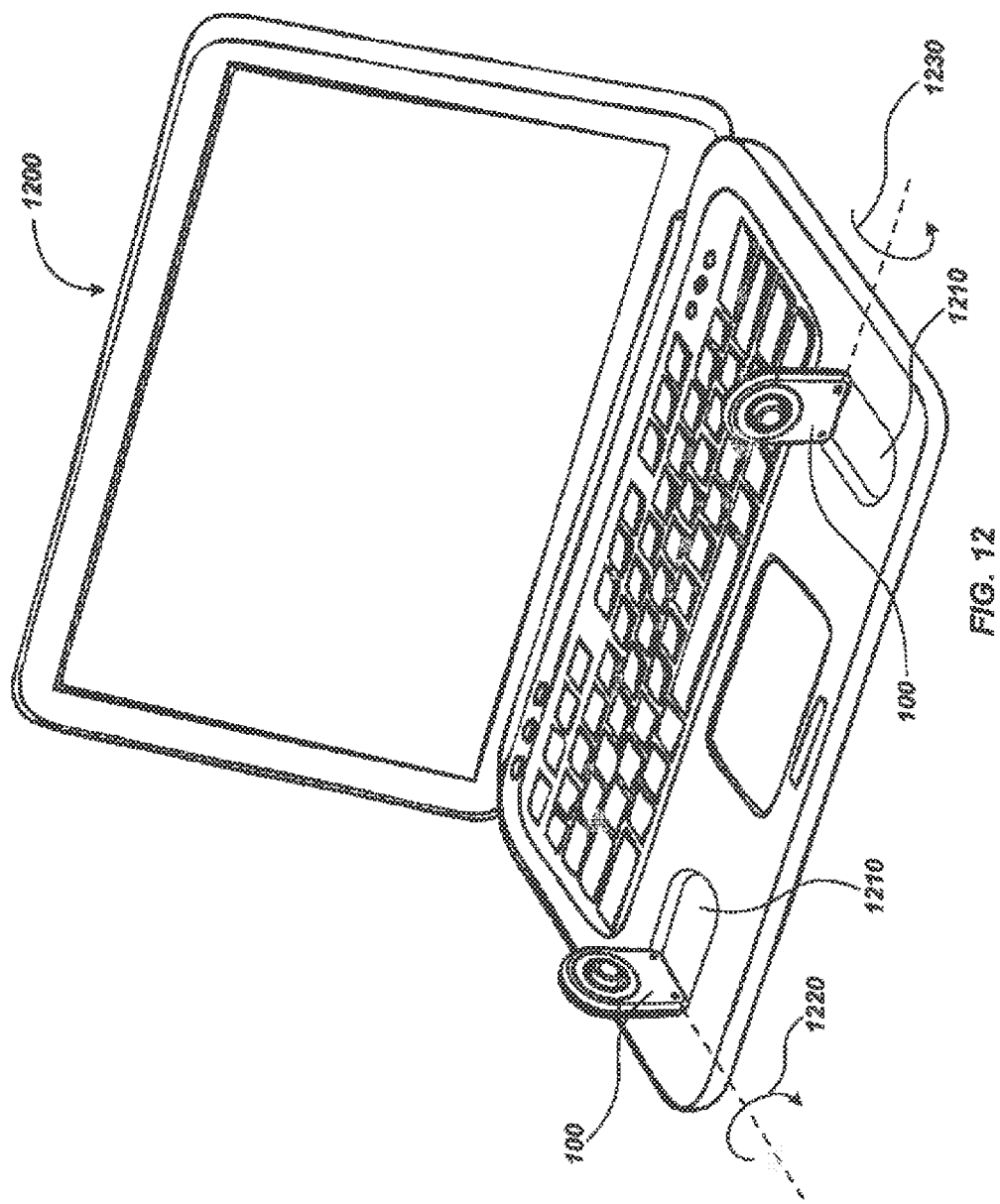
FIG. 12 is a laptop computer embodiment of an electronic computing system utilizing two of the slim profile magnetic user interface device embodiments of FIG. 1.
Figure 13:
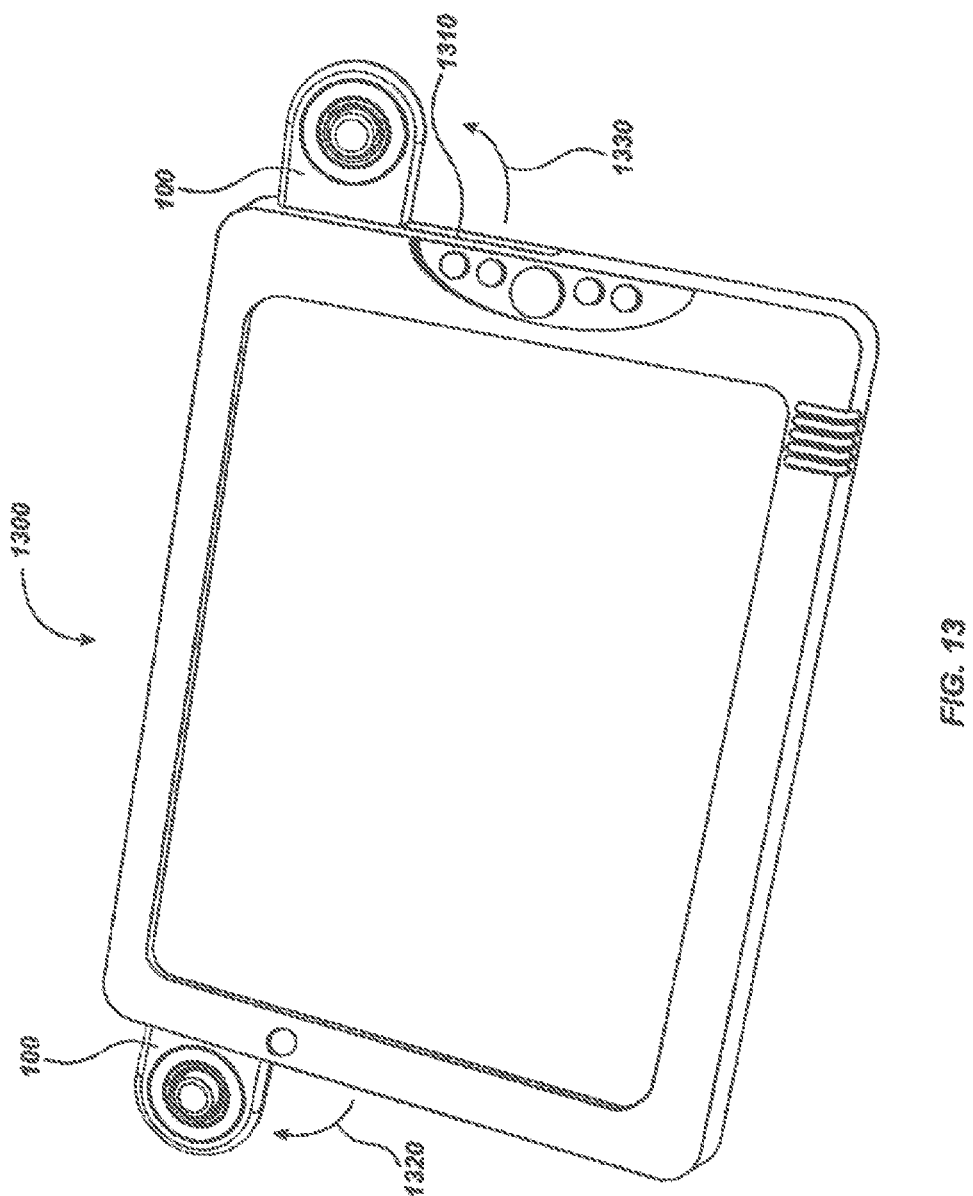
FIG. 13 is a tablet computer embodiment of an electronic computing system utilizing two of the slim profile magnetic user interface device embodiments of FIG. 1.
Figure 14:
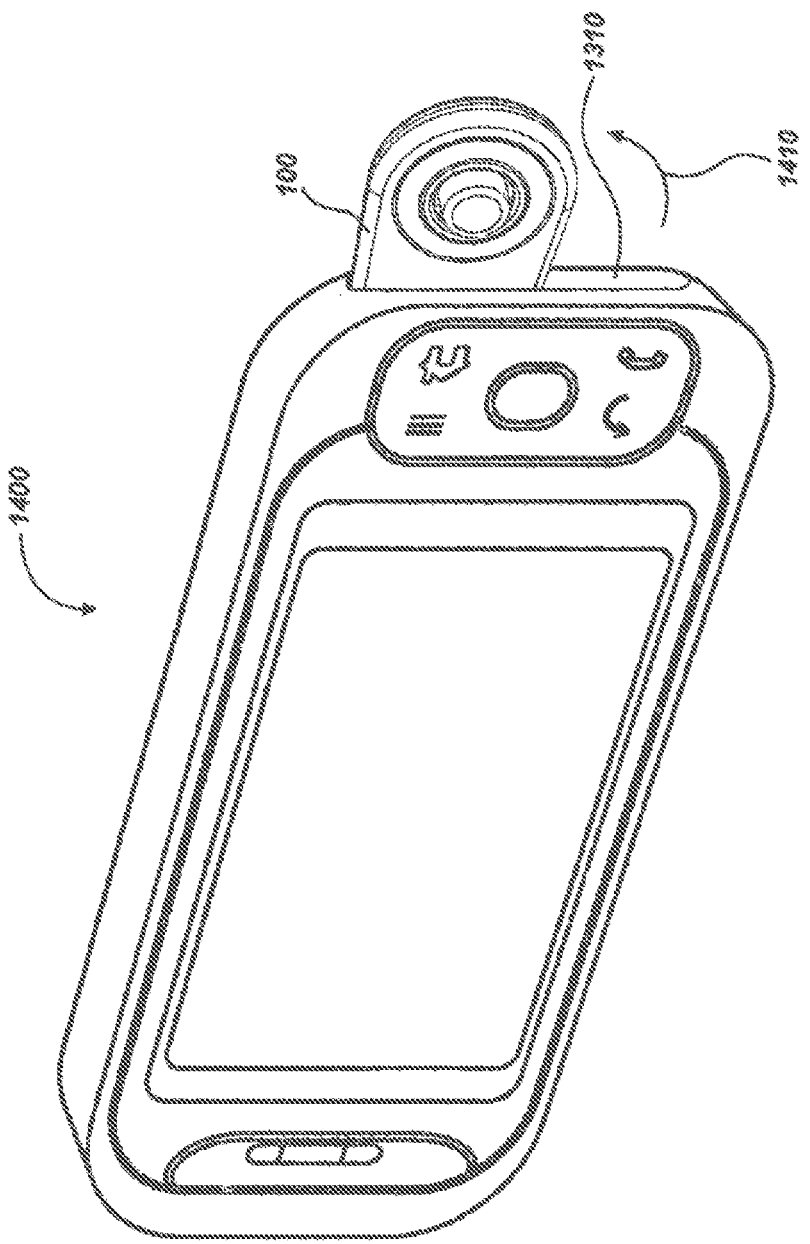
FIG. 14 is a touchscreen keyboard style smartphone embodiment of an electronic computing system utilizing one of the slim profile magnetic user interface device embodiments of FIG. 1.
Figure 15:
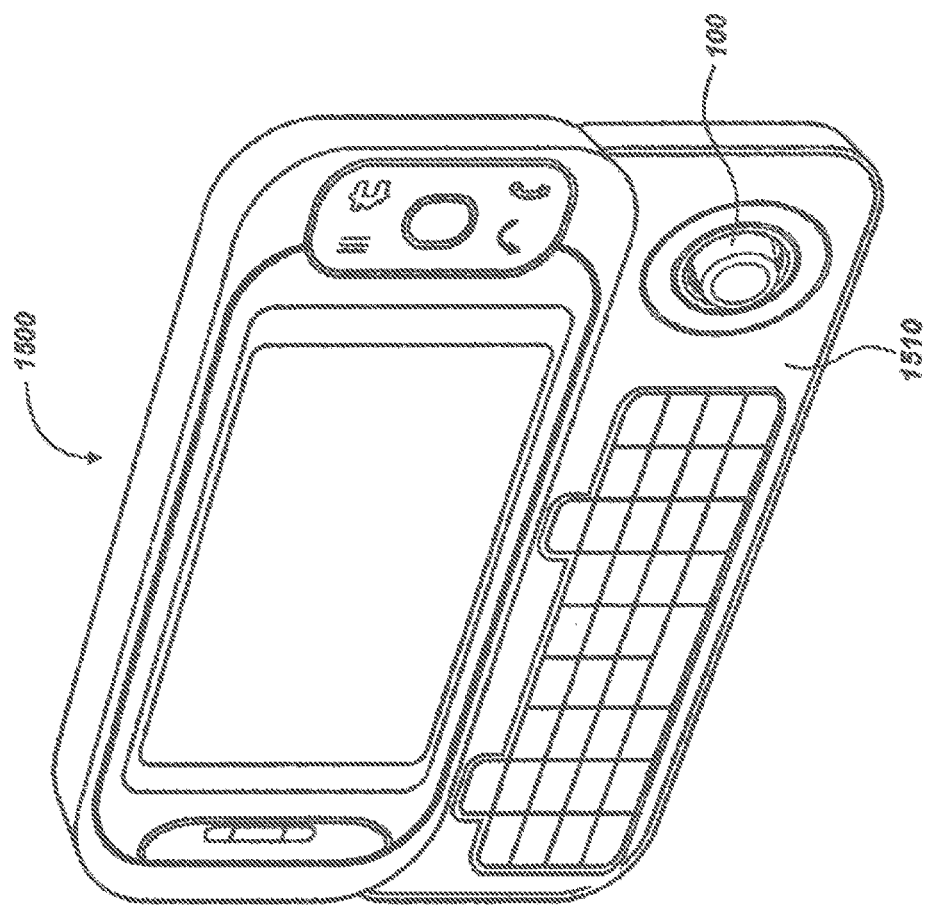
FIG. 15 is a slide-out keyboard style smartphone embodiment utilizing one of the slim profile magnetic user interface device embodiments of FIG. 1.

Referring to FIGS. 12-15, example portable electronic devices that may use embodiments of slim profile magnetic user interface devices such as the slim profile magnetic user interface device embodiment 100 include, but are not limited to, a laptop computer 1200 (as shown in FIG. 12), a tablet computer 1300 (as shown in FIG. 13), a touchscreen keyboard style smartphone 1400 (as shown in FIG. 14), and a slide-out keyboard style smartphone 1500 (as shown in FIG. 15).

There are various ways in which embodiments of slim profile magnetic user interface devices, such as slim UID embodiment 100, may be mounted and stowed within a corresponding portable electronic computing system such as a phone, game controller, tablet or other small computer device, or other paired device when not in use. For example, laptop computer embodiment 1200 of FIG. 12 illustrates two possible mounting orientations of slim UIDs within a fold-out groove 1210. In this configuration, a slim UID may be mounted to a movable hinge or rotation mechanism to slide and/or retract into the computer case. Slim UIDs may, for example, be rotated along an axis formed along the flattened edge nearest the electrical connector 150. A direction 1220 and a rotated direction 1230 are illustrated to show ways in which the slim profile UIDs may be rotated to be stowed away within the fold-out groove 1210 of the laptop computer 1200 when not in use.

In tablet computer embodiment 1300 as illustrated in FIG. 13, two slim profile magnetic user interface devices 100 are mounted such that each rotate out of a stowage pocket 1310 along a pivot direction 1320 or an opposite direction 1330.

Touchscreen keyboard style smart phone embodiment 1400 illustrated in FIG. 14 also shows the use of the stowage pocket 1310 where one of the slim profile magnetic user interface devices 100 may be rotated out along a pop-out pivot direction 1410 for use.

A slim profile UID may be contained within a slide-out keyboard section 1510 when mounted to a slide-out keyboard style smartphone, such as smartphone embodiment 1500 of FIG. 15. Flex circuitry or other flexible wiring or sliding contact mechanisms (not shown) may be used to provide a reliable, flexible electrical connection when a slim profile UID is rotated such as shown in FIGS. 12, 13, and 14.

Figure 16:
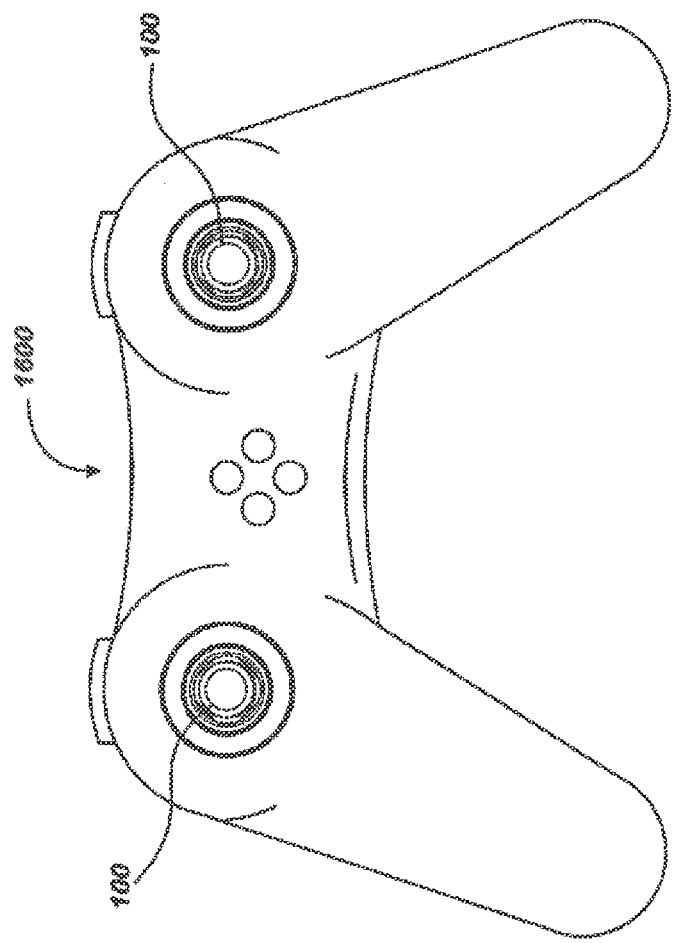
FIG. 16 is a game controller embodiment utilizing two of the slim profile magnetic user interface device embodiments of FIG. 1.

FIG. 16 illustrates details of an embodiment of a game controller device 1600 including two slim profile UIDs, which may be slim UIDs 100 as described previously herein. Game controller 1600 may use two (as shown) or more slim UIDs to provide additional resolution and degrees of freedom control over an electronic computing system in the form of a video game or system, such as, for example, a Playstation, Wii, Xbox, or other game system or device, as compared to a conventional video game controller device. In addition, for embodiments for use in a system such as that shown in FIG. 16, such as an Xbox-like game controller or other similar or equivalent device, two arms that a user grips may be configured to rotate slightly around the axis of the actuator, thereby providing additional sensing capability. Other electronic computing systems, in addition to video game systems, may similarly benefit from receipt of additional input information as may be provided from a game controller, such as controller device 1600, having multiple UID elements.

In embodiments of devices such as game controllers for a system like the Nintendo WII system, output signals from accelerometers or other inertial sensors may be used to indicate addition actions or commands. For example, they may be used to sense case or housing movements. In addition, accelerometers or other inertial sensors may be used in some embodiments to detect a released state of an actuator assembly when a slim UID device is placed on a stable surface, such as an immobile, fixed surface such as a desk or table.

It is noted that in FIGS. 12, 13, and 16, the laptop or notebook computer 1200 (as shown in FIG. 12), the tablet computer 1300 (as shown in FIG. 13), and the game controller 1600 (as shown in FIG. 16) are shown with two of the slim UIDs so as to demonstrate some possible orientations. However, in various other embodiments, the specific placement and/or orientation of the slim UIDs may be turned in one direction or another to account for ergonomics, ease in assembly, or other constraints. Alternately, in some embodiments, only a single slim UID may be used or, in some embodiments, more than two may be used. In general, only a single slim UID 100 with a three-axis magnetic sensor needs be used to gain six degrees of freedom control.

Some embodiments may use high sensitivity magnetic sensors paired with a small magnet or magnets, such as the commercially available BLBC3-B CMOS 3D Compass sensors from Baolab Microsystems or Xtrinsic MAG3110 Digital Magnetometers from Freescale, or other compass or high sensitivity sensors. In such embodiments, one or more magnetic sensors may be used as a reference sensor to measure and generate reference signals that may be used to subtract off any local or background magnetic fields, such as the earth's magnetic field or locally generated magnetic fields.

In some embodiments, permanent magnets, such as described previously herein, may be replaced, in whole or in part, with electromagnets, such as chip scale electromagnet devices (which may be configured, for example, similarly to small SMT inductors). A high sensitivity sensor device, such as a compass sensor as described previously herein, may be used with the electromagnet to build a compact, single sensor user interface device. This approach may be viewed similarly to a configuration where "permanent" magnets could be switched off and on, such as by a processing element as described previously herein, thereby allowing use of two or more different electromagnets with a single compact three axis sensor. This allows a far smaller, lower cost, single sensor magnetic user interface device to be built compared to one having multiple three axis sensors or larger three-axis sensors.

Applications for this type of compact device may include notebook computers, smart phones, tablet devices, or devices where small and/or thin user interface devices may be useful. Since high sensitivity sensors such as compass sensors are very sensitive, a very low powered, very small electromagnet array (e.g., a cross-shaped pair or other configuration of electromagnets) may be used in place of permanent magnets in some implementations.

In such a configuration, the electromagnets may be controlled (e.g., switched on or off and/or be adjusted relative to each other and/or relative to power level) by an electromagnet control element or module. The electromagnet control element may be, for example, integral with or controlled by a processing element of the slim UID device or may comprise a separate electronic control circuit based on a microprocessor, microcontroller, or other programmable device or module, which may further include switching circuits, power-control circuits, and/or other control elements.

One potential advantage of such an implementation is that a pair of crossed dipoles (e.g., the energized electromagnets) that are energized in sequence or in combination may be used to eliminate ambiguity associated with the movement around the axis of symmetry of a single dipole, and thereby allow a single three axis sensor to be used while still allowing up to six degrees of freedom to be sensed. Electromagnet embodiments may use similar elements and methods to those described previously herein for permanent magnet implementations. The primary difference is replacement of one or more permanent magnets with small controllable electromagnets (e.g., dipoles), and associated electromagnet driver controls and/or associate sensor controls, which may be part of a processing element.

For example, in one embodiment of an electromagnet magnetic UID configuration a cross-shaped electromagnet may use a small chip scale, wire wound surface mount (SMT) cross dipole inductor that can produce either a magnetic dipole A or a magnetic dipole B, such as by using a cross-shaped electromagnet, when electric current is run through wire windings A or B, to which power may be controlled by the electromagnet control element.

A cross-shaped electromagnet may be placed above a small digital magnetometer (such as Freescale MAG3110 device or other similar or equivalent device), and the crossed dipole may be moved by the user relative to a small compass or other high sensitivity magnetic field sensor (e.g., digital magnetometer) device, and sequential measurements of the field of dipole A and then dipole B may be measured when current is passed through each of these in sequence, thereby allowing the positional displacement and tilt of the relative movement and tilt between the two components to be measured.

Another potential advantage of use of an electromagnet is that both magnets A and B can be turned off, thereby allowing a reference measurement of the background ambient magnetic field to be made, allowing the orientation of the UID to be measured with respect to the earth's magnetic field. This can allow for a correction for the biasing effect of the earth's magnetic field and may provide an improvement in accuracy. It may also allow the user interface to note when the rotation of the UID is changed by the user, thereby allowing a behavior change with respect to the indicated operator motion with respect to the orientation of the user display.

While we have described and illustrated various exemplary embodiments of slim profile magnetic user interface devices, modifications and adaptations of the embodiments described herein will be apparent to persons skilled in the art. For example, an initial calibration of a slim UID may be used to compensate for errors in positioning of the magnet(s) and/or magnetic sensor(s) due to manufacturing tolerances or other variation, and may be stored in the device, such as in a memory of a processing element.

More than one permanent magnet or electromagnet and corresponding magnetic sensor may be used in alternative embodiments of slim magnetic UIDs, and the relative positioning of magnets and magnetic sensors may be varied or reversed. For example, in embodiments of slim UIDs with more than one magnet and more than one magnetic sensor, the magnetic sensors may preferably be placed far enough apart so that the magnetic field generated by each of the magnets does not strongly influence the measured magnetic fields at each of the magnetic sensors. Furthermore, other shapes, sizes, magnetic field orientations, positions, and configurations of magnets and magnetic sensors, such as those described in the Related Applications, may also be used within various device implementations.

In some configurations, the slim UID apparatus, devices, methods, or systems described herein may include means for implementing features or providing functions described herein, such as means for generating, receiving, processing, storing, and/or outputting magnetic sensor signals and generating corresponding output signals suitable for use by an electronic computing system. In one aspect, the aforementioned means may be a module or assembly including a processor or processors, associated memory and/or other electronics in which embodiments of the invention reside, such as to implement the various aspects and functions as described herein. These may be, for example, modules or apparatus residing in printed circuit boards and/or in software in the slim UID and/or in personal computers or other electronic computing systems, game controllers, mobile phones or smart phones, tablet devices, or other electronic devices or systems.

In one or more exemplary embodiments, the electronic functions, methods and processes described herein and associated with magnetic signal processing functions may be implemented in hardware, software, firmware, or any combination thereof. If implemented in software, the functions may be stored on or encoded as one or more instructions or code on a non-transitory computer-readable medium that may be executed by a processor or other programmable device. Computer-readable media includes computer storage media. Storage media may be any available media that can be accessed by a computer processor or processors. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media include all forms of computer-readable media except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure.

Those of skill in the art would understand that information and signals, such as video and/or audio signals or data, control signals, command signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Signals may be formatted in accordance with definitions and specifications defining such signals, such as USB® signals, Firewire® signals, or other currently defined signaling formats or signaling formats later-developed in the art.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative functions and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the embodiments described herein will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and/or illustrated in the accompanying drawings.

It is noted that reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects and embodiments is provided to enable any person skilled in the art to make or use the present invention. Various modifications to these aspects will be readily apparent to those skilled in the art, and the generic principles defined herein may be applied to other aspects without departing from the spirit or scope of the invention. Thus, the invention is not intended to be limited to the aspects shown herein but is to be accorded the widest scope consistent with the following claims and their equivalents.

I claim:

1. A slim profile magnetically sensed user interface device, comprising:
a slim profile housing assembly having a front face and a back face;
a movable actuator assembly disposed in the housing assembly, the movable actuator assembly including:
a front contact element having a front contact surface disposed on the front face for receiving user touch input;
a back contact element having a back contact surface disposed on the back face for receiving user touch input;
an actuator support assembly; and
a permanent magnet;
a three-axis magnetic sensor that senses magnetic fields in three orthogonal axes at a compact point in space, the magnetic sensor positioned to sense a position or motion of the magnet of the movable actuator assembly and generate a magnetic sensor output signal associated with the position or motion of the magnet in three axes in space;
a processing element for receiving the magnetic sensor output signal as an input and generating, based at least in part on the magnetic sensor output signal, a processing element output signal corresponding to a position or motion of the actuator assembly in response to a user actuation; and an output interface circuit for operatively coupling the processing element output signal to a notebook or laptop computer, cellular phone, or tablet device.

2. The user interface device of claim 1, wherein the front and back contact elements comprise actuator caps.

3. The user interface device of claim 1, wherein the front and back contact elements comprise elastomeric materials.

4. The user interface device of claim 1, wherein the magnetic sensor and the processing element are disposed on a printed circuit board positioned within the slim profile housing assembly.

5. The user interface device of claim 4, wherein the actuator assembly includes an actuator PCB and the magnet is disposed on the actuator PCB.

6. The user interface device of claim 1, wherein the actuator assembly includes a switching element comprising a dome switch.

7. The user interface device of claim 1, wherein the housing includes a semicircular shaped portion and a rectangular shaped portion adjacent to the semicircular portion.

8. The user interface device of claim 1, wherein the actuator assembly includes the magnetic sensor and the magnet is fixed relative to the user interface device.

9. The user interface device of claim 1, wherein the actuator assembly includes the magnet and the magnetic sensor is fixed relative to the user interface device.

10. The user interface device of claim 1, further including an accelerometer disposed in the slim profile housing, wherein the accelerometer senses a motion or position of the device and provides corresponding information to the processing element to generate the processing element output signal.

11. The user interface device of claim 1, wherein the actuator assembly further includes a force-sensing mechanism coupled to the front contact element.

12. The user interface device of claim 11, wherein the force-sensing mechanism comprises a force-sensing resistor.

13. The user interface device of claim 1, further comprising a switching element coupled to one or both of the front contact element and the back contact element with a punch element.

14. The user interface device of claim 1, wherein the output interface circuit comprises a USB circuit and a USB electrical connector.

15. The user interface device of claim 1, wherein the output interface circuit comprises a USB circuit and a USB electrical connector.

16. The user interface device of claim 1, including an output interface circuit for operatively coupling the processing element output signal to a video game device.

17. The user interface device of claim 1, wherein the housing assembly comprises a video game controller housing and the movable actuator assembly comprises a video game user actuator assembly.

* * * * *